(12) United States Patent
Jitaru

(10) Patent No.: US 10,050,545 B2
(45) Date of Patent: Aug. 14, 2018

(54) TRUE SOFT SWITCHING BY TIMED STEERING OF A CURRENT SOURCE

(71) Applicant: ROMPOWER ENERGY SYSTEMS, INC., Tucson, AZ (US)

(72) Inventor: Ionel Jitaru, Tucson, AZ (US)

(73) Assignee: ROMPOWER TECHNOLOGY HOLDINGS, LLC, Milford, DE (US)

( * ) Notice: Subject to any disclaimer, the term of this patent is extended or adjusted under 35 U.S.C. 154(b) by 0 days.

(21) Appl. No.: 15/899,243

(22) Filed: Feb. 19, 2018

(65) Prior Publication Data

US 2018/0198374 A1    Jul. 12, 2018

Related U.S. Application Data

(63) Continuation-in-part of application No. 15/825,647, filed on Nov. 29, 2017, and a continuation-in-part of application No. 15/068,598, filed on Mar. 13, 2016, now Pat. No. 9,985,546, and a continuation-in-part of application No. 14/890,088, filed as application No. PCT/US2014/037736 on May 10, 2013, now Pat. No. 9,899,929, application No. 15/899,243, which is a continuation-in-part of application No. 14/274,701, filed on May 10, 2014.

(60) Provisional application No. 62/429,373, filed on Dec. 2, 2016, provisional application No. 62/587,816, filed on Nov. 17, 2017, provisional application No. 62/133,245, filed on Mar. 13, 2015, provisional application No. 61/821,902, filed on May 10, 2013, provisional application No. 61/821,896, filed on May (Continued)

(51) Int. Cl.
  *H02M 3/335* (2006.01)
  *H02M 1/12* (2006.01)
  *H02M 1/00* (2006.01)

(52) U.S. Cl.
  CPC ........ *H02M 3/33592* (2013.01); *H02M 1/12* (2013.01); *H02M 3/3353* (2013.01); *H02M 3/33553* (2013.01); *H02M 2001/0058* (2013.01)

(58) Field of Classification Search
  CPC .................................................. H02M 3/3353
  USPC ...................................... 363/21.06, 21.14, 97
  See application file for complete search history.

(56) References Cited

U.S. PATENT DOCUMENTS

| 9,899,929 B2* | 2/2018 | Jitaru ................ H02M 3/33592 |
| 2016/0094137 A1* | 3/2016 | Jitaru ................. H02M 3/3353 363/21.03 |
| 2017/0012547 A1* | 1/2017 | Jitaru ....................... H02J 3/00 |

* cited by examiner

*Primary Examiner* — Jeffrey Sterrett
(74) *Attorney, Agent, or Firm* — Yakov S. Sidorin; Quarles & Brady LLP

(57) ABSTRACT

A method for operation of a single-ended forward converter to achieve "true soft switching" The method includes injecting, with a current source and in transformer winding, a narrow pulse of current via an injection winding of the transformer to add such pulse to the magnetizing current to exceed the current level of current passing through freewheeling rectifier to reduce that current to zero time when the freewheeling rectifier is turns off at zero current conditions. Further, the sum of the magnetizing current and the injected current provide the current required by the output inductor during the transition time. The amplitude of injected current is defined such that the sum is greater than the minimum current through the output inductor (at least by an amount that reflects into the primary winding). The amount of current reflected in the primary is chosen to be sufficiently large to discharge parasitic capacitances reflected across the primary main switch to zero during the transition time.

7 Claims, 32 Drawing Sheets

Related U.S. Application Data

10, 2013, provisional application No. 62/591,594, filed on Nov. 28, 2017.

$$I_M = \frac{1}{2} * Vin \sqrt{\frac{L_1}{C_{eq}}}$$

$$C_{eq} = C_{oss(M_1)} + C_{oss(M_1)} + C_{Trp}$$

$$I_{Pneg} = \frac{\left(I_{inj}\frac{N_3}{N_2} + I_M\right) - I_{(Lo)min}}{\frac{N_1}{N_2}}$$

TRUE SOFT SWITCHING BY TIMED STEERING OF A CURRENT SOURCE

CROSS-REFERENCE TO RELATED APPLICATIONS

This Patent Application is a continuation-in-part of the U.S. patent application Ser. No. 14/890,088 filed on Nov. 9, 2015 and now published as US 2016/0094137, which is a US national phase application from the International Patent Application No. PCT/US2014/037736 filed on May 12, 2014, which in turn claims priority from the U.S. Provisional Patent Application No. 61/821,902 filed on May 10, 2013.

This Patent Application is also a continuation-in-part of the U.S. patent application Ser. No. 14/274,701 filed on May 10, 2014 and now published as US 2014-0334188, which claims priority from the U.S. Provisional Patent Application No. 61/821,896 filed on May 10, 2013.

This Patent Application is also a continuation-in-part of the U.S. patent application Ser. No. 15/068,598, filed on Mar. 13, 2016 and now published as US 2017/0012547, which claims priority from the U.S. Provisional Patent Application No. 62/133,245 filed on Mar. 13, 2015.

This Patent Application is also a continuation in part from the U.S. patent application Ser. No. 15/825,647, filed on Nov. 29, 2017, which claims priority from and benefit of U.S. Provisional Patent Applications No. 62/429,373 filed on Dec. 2, 2016.

This Patent Application also claims priority from the U.S. Provisional Patent Application No. 62/591,594 filed on Oct. 12, 2017 and No. 62/587,816 filed on Nov. 17, 2017.

The disclosure of each of the above-identified applications is incorporated herein by reference.

TECHNICAL FIELD

This applications relates to power converters configured according to a forward topology and, in particular, to a method for engagement of a single-ended forward power converter to ensure a true soft switching operation of such converter.

Related art recognizes the term "soft switching" as a term describing and related to methodologies of operating a converter under the conditions that results in the situation when the primary switching elements (that is, the switching elements on the primary side of the converter, or the primary switchers, for short) are turned on at zero voltage. However, such methodologies do not create or result in "soft switching" as far as the secondary switching elements (that is, the switching elements at the secondary side of the converter, or secondary switchers, for short) are concerned. For the purposes of this application, soft switching for the secondary side of a power converter means, relates to, and defines the situation when the secondary switching elements turn off at zero current and there is no ringing and "spikes" across the secondary switchers at a turn off.

In particular, the converters of related art that are configured to operate in the soft switching regime do not ensure soft switching across the secondary side while the converter is operating in continuous mode. The term "continuous mode of operation" (or a similar term) as applied to the power converter describes and defines the situation when the current through the output inductor o the secondary side does not reach zero level during the steady state operation.

SUMMARY

Embodiments of the invention provide methods for operating a power converter configured as a single-ended circuitry. In one embodiment of the converter, the single-ended circuitry includes a primary side and a secondary side; a transformer having a primary side winding on the primary side and a first secondary side winding and an auxiliary winding on the secondary side; first and second switching elements at the primary side; first and second reset rectifiers at the primary side; first and second synchronous rectifiers at the secondary side; an output inductor on the secondary side. Here, the auxiliary winding is a part of a current injection circuitry contains a source of current, while the current injection circuitry is configured to transmit injection current, produced by the source of current, into the auxiliary winding. An embodiment of the method includes a step of reducing an amplitude of overall current flowing through the least one of the first and second synchronous rectifiers by transmitting a first magnetizing current through the at least one of the first and second synchronous rectifiers, wherein the first magnetizing current is generated from energy stored in parasitic capacitances of the first and second switching elements. Such step is taken only after (i) transferring energy from the primary side to the secondary side in a forward mode, and (ii) resetting the transformer with a current flowing through the first and second reset rectifiers, which resetting causes a first current to flow at the secondary side through the at least one of the first and second synchronous rectifiers and the output inductor towards an output of the circuitry. The embodiment of the method further includes a step of activating the source of current to deliver the injection current into the auxiliary winding and to turn off the at least one of the first and second synchronous rectifiers. This step is taken at the moment when voltage across the at least one of the first and second synchronous rectifiers is substantially zero,

Figure 1A:
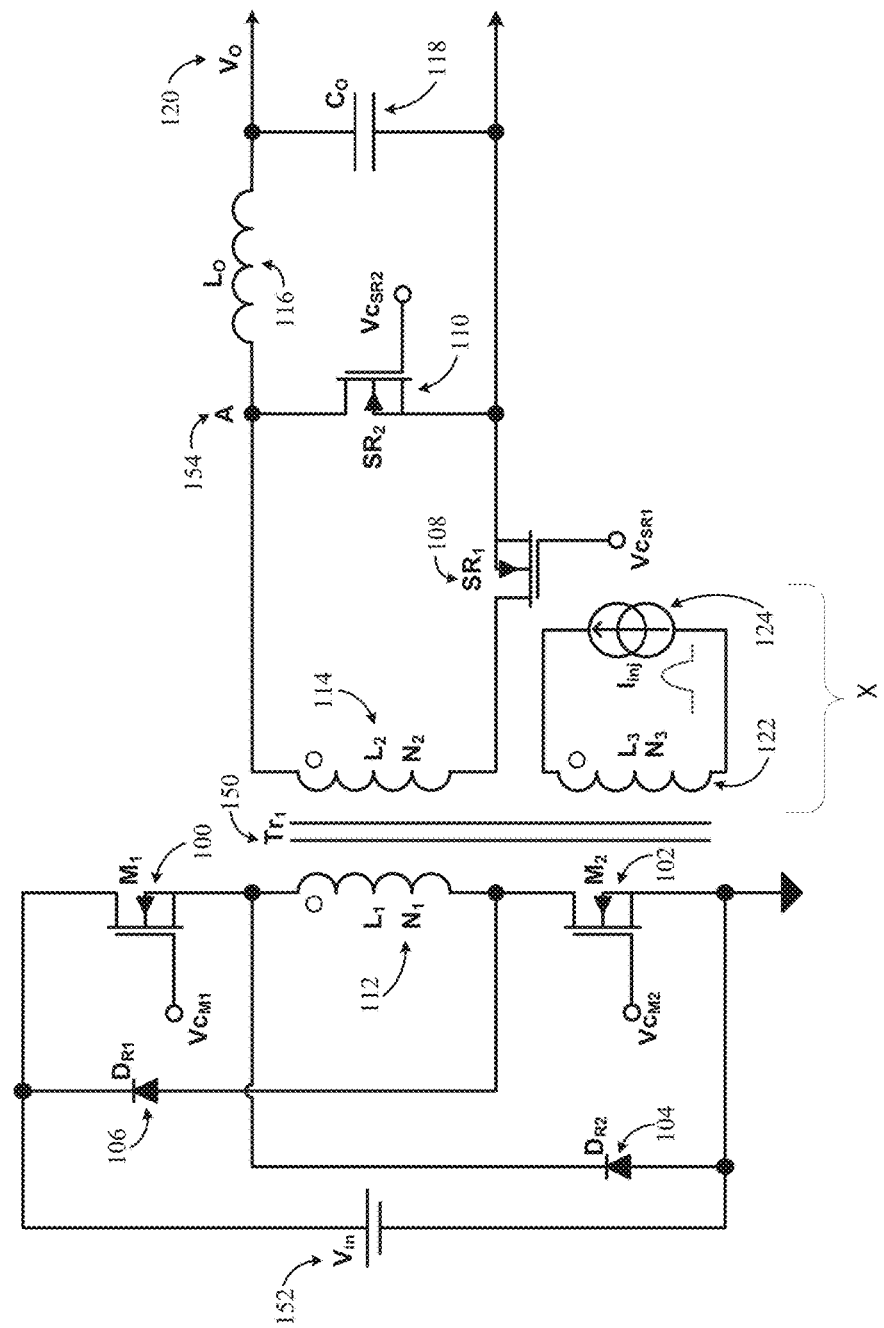
FIG. 1A schematically illustrates two transistors single-ended forward topology with current injection in the transformer.

Generally, the sizes and relative scales of elements in Drawings may be set to be different from actual ones to appropriately facilitate simplicity, clarity, and understanding of the Drawings. For the same reason, not all elements present in one Drawing may necessarily be shown in another.

DETAILED DESCRIPTION

For the purposes of this disclosure and accompanying claims, the term "true soft switching" identifies and defines the situation when the primary switchers in a power converter turn on at zero voltage and the secondary switchers turn off at zero current while the voltage across the secondary switchers does not have (is devoid of, lacking) spikes and ringing at turn off.

According to the idea of the invention, elimination of the ringing and spikes across the switching elements in the secondary side of the converter implies that the turn off is effectuated when the current through the secondary switching elements has a very low amplitude and that the charge of the parasitic capacitance across the secondary switching elements is carried out with the use of a current source.

The methodology described in US 2016/0094137 relies on utilization of the magnetizing current, in the transformer, that derives its energy from the energy contained in the parasitic capacitances across the primary switchers. (This magnetizing current is now referred to as a "parasitic-capacitance-based magnetizing current".) Under the conditions where the amplitude of such magnetizing current is larger than the minimum current through the output inductor of the circuitry (also known as a "choke"), the current through the secondary switchers turn off at zero current and the voltage across them does not have spikes and ringing. Further, the difference in magnitude between parasitic-capacitance-based magnetizing current and the current through the output inductor at its lowest amplitude reflects in the primary side (after the secondary switchers turn off) as a current that discharges the parasitic capacitance across the primary switchers towards zero creating zero voltage switching conditions. The terms "reflection", "reflects" and similar terms applied to the current in a transformer based circuitry defer to the situation when a first current is reproduced as a second current with changes corresponding to difference in the number of windings of associated inductors.

In most of the applications, the magnetizing current derived from the energy continued in the parasitic capacitances across the primary switchers is not larger than the minimum value of current passing through the output inductor. This limits the utilization of the methodology described in US 2016/0094137, technology especially for high current applications.

One of the embodiments described in US 2016/0094137 presented a concept facilitating the elimination of such limitations. The relevant technique stems from the idea of configuring a current source to inject a pulse of current in the switching node connected to the output inductor. This can be implemented in multiple ways.

The idea of the present invention, on the other hand, stems from the realization that the use of a current source circuitry configured to inject a pulse of current to such target switching node via the transformer winding will cause the true soft switching conditions. In this application, such methodology is extended to all single-ended forward converter circuitries operating in a continuous mode and regardless of how the magnetizing current is derived. The term "single-ended" applied to a power converter circuitry implies that the secondary side of the power converter contains two rectifiers, the output inductor, and a capacitor.

FIG. 1A illustrates a two transistor forward topology employing a current injection (from a current source circuitry denoted as X) in an auxiliary winding, which is well coupled with the rest of the windings in the transformer. The two transistor forward topology contains two switching elements, M1, 100, and M2, 102, and a transformer (Tr1, 150) having a primary winding L1, 112, a secondary winding L2, 114 and an auxiliary winding L3, 122. Two reset rectifiers, Dr1, 106, and Dr2, 104, are placed across the primary winding 112 of the transformer 150. On the secondary side, there is a secondary winding 114, two synchronized rectifiers, SR1, 108 (referred to as a forward rectifier) and SR2, 110 (referred to as a freewheeling rectifier). The output filter formed by output inductor Lo, 116 and output capacitor Co, 118 is placed between the switching node A, 154 and the ground. The output voltage (Vo, 120) is further connected to the load (not shown).

Figure 1B:
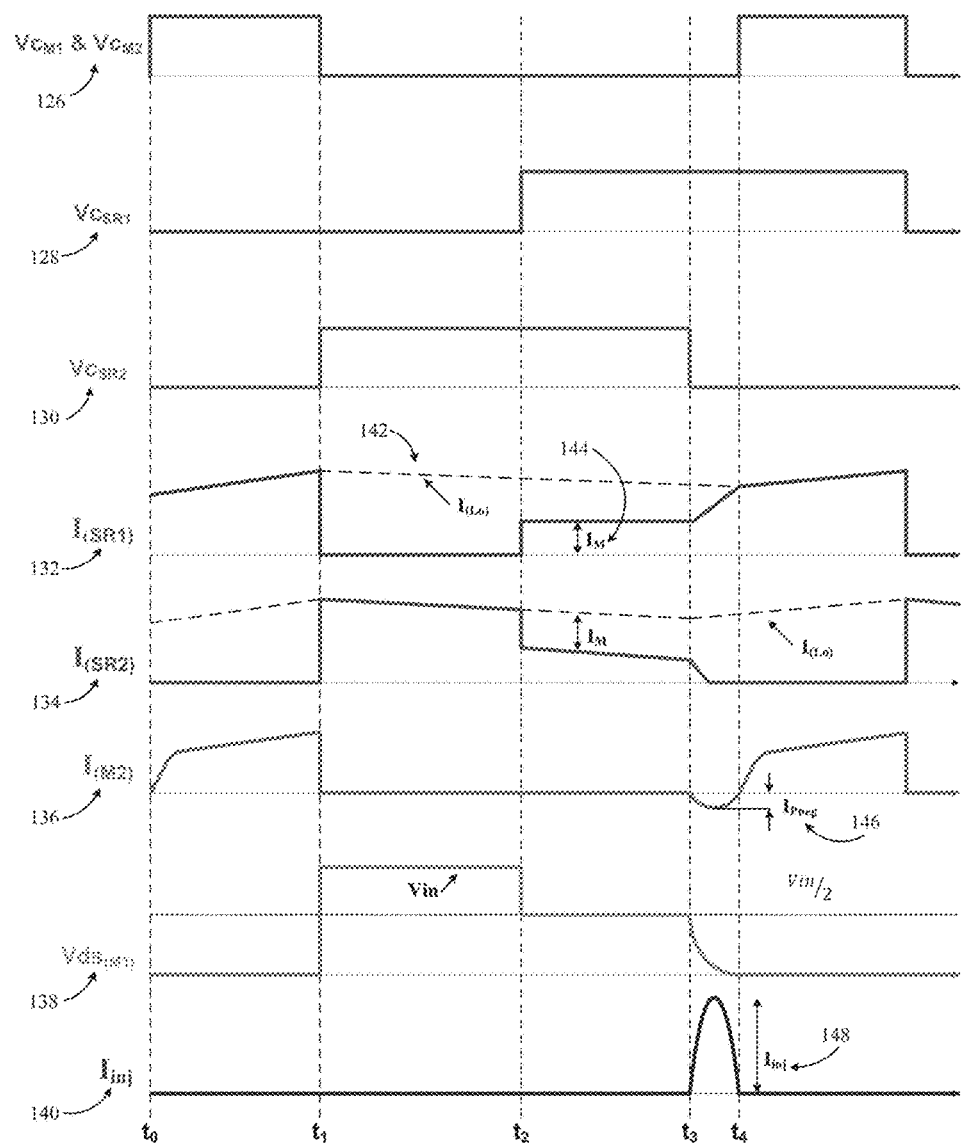
FIG. 1B shows the key waveforms of the topology of FIG. 1A.
Figure 1C:
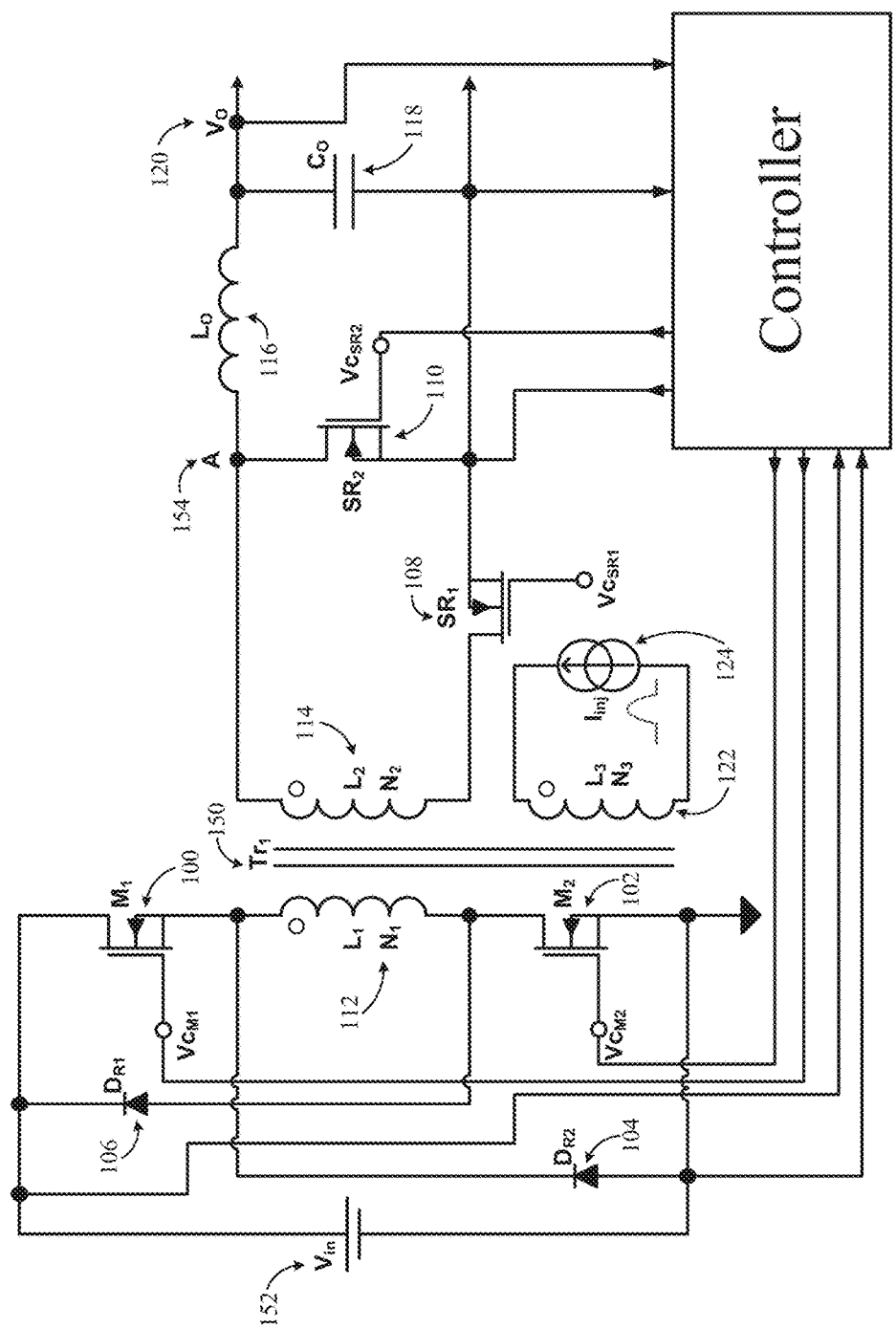
FIG. 1C shows the topology of FIG. 1A complemented with the controller.

FIG. 1B presents the key waveforms of the converter, VcM1 and VcM2, 126, which operate as the control signals for M1 and M2; the control signal for SR1, VcSR1, 128; the control signal for SR2, VcSR2, 130; current I(SR2), 132 through the SR2; current I(SR1), 134 through SR1; current I(M2), 136 through the primary switcher M2, and; voltage Vds(M1) 138 across M1; and current Iinj, 140 injected in the winding 122.

Five time intervals of operation can be generally observed and/or identified.

Figure 2A:
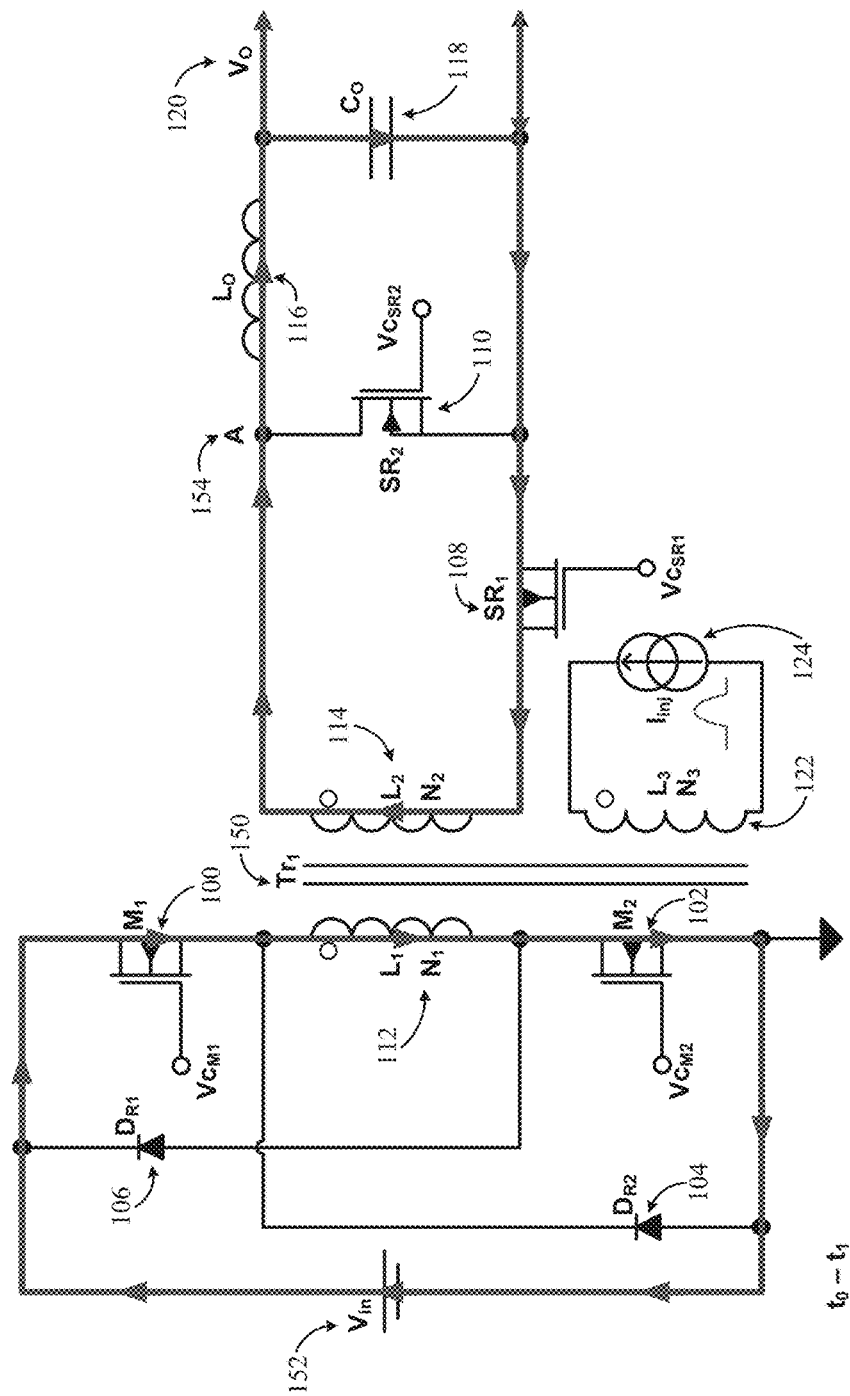
FIG. 2A shows the topology of FIG. 1A with the current flow in the time interval t0-t1.
Figure 2B:
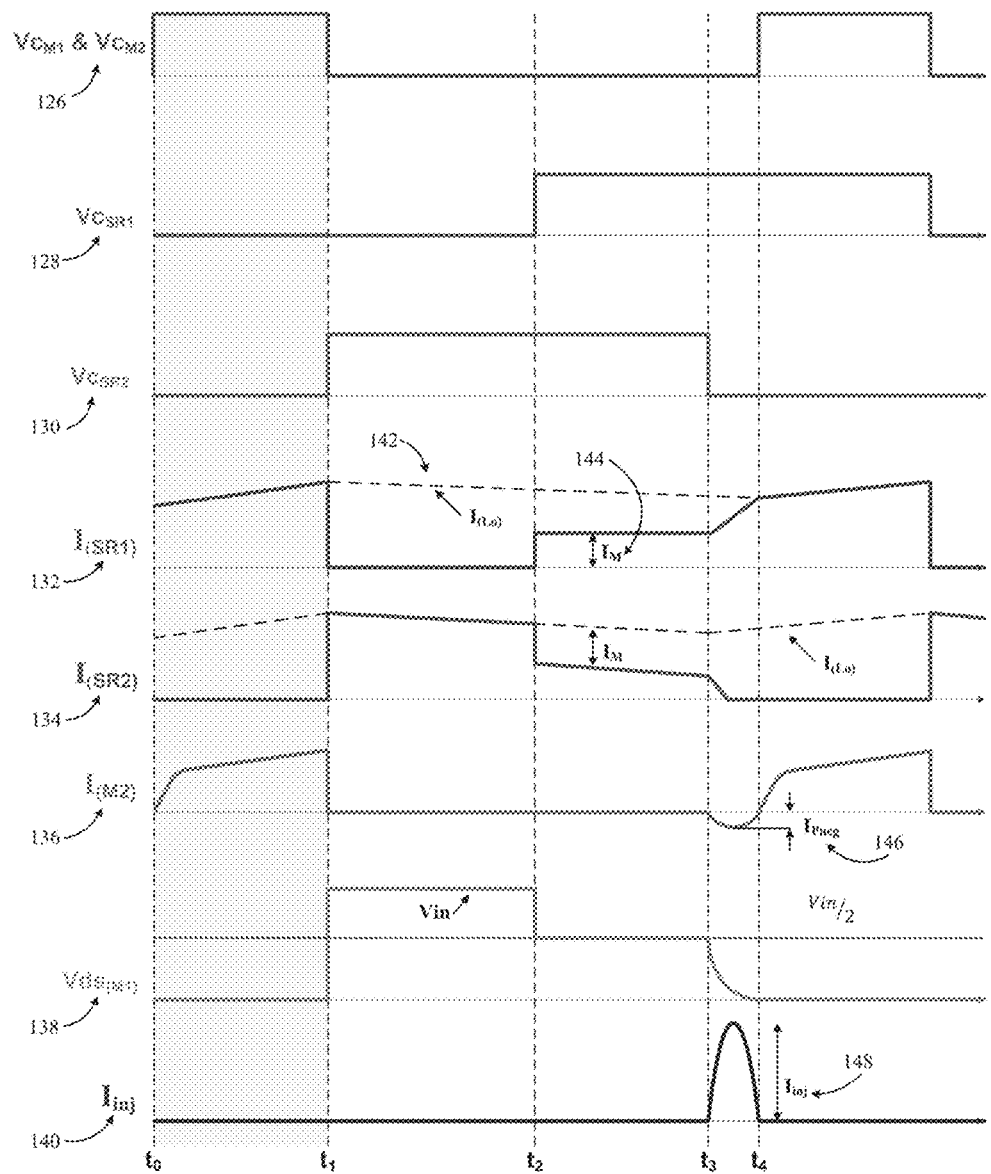
FIG. 2B shows the key waveforms for the topology from FIG. 1A, underlining the t0-t1 time interval.

In the time interval to-t1 (and in reference to FIGS. 2A and 2B), M1 and M2 conduct and the current in the primary side is flowing through M1, M2 and the primary winding 112, as shown by the arrows. In secondary, the current is flowing through the secondary winding 114 and the output inductor (Lo, 116) to (Co, 118) and to the load, and back through (SR1, 108). During this time interval, the energy is transferred from the primary side to secondary side in a forward mode and some energy is stored in (Lo, 116).

Figure 3A:
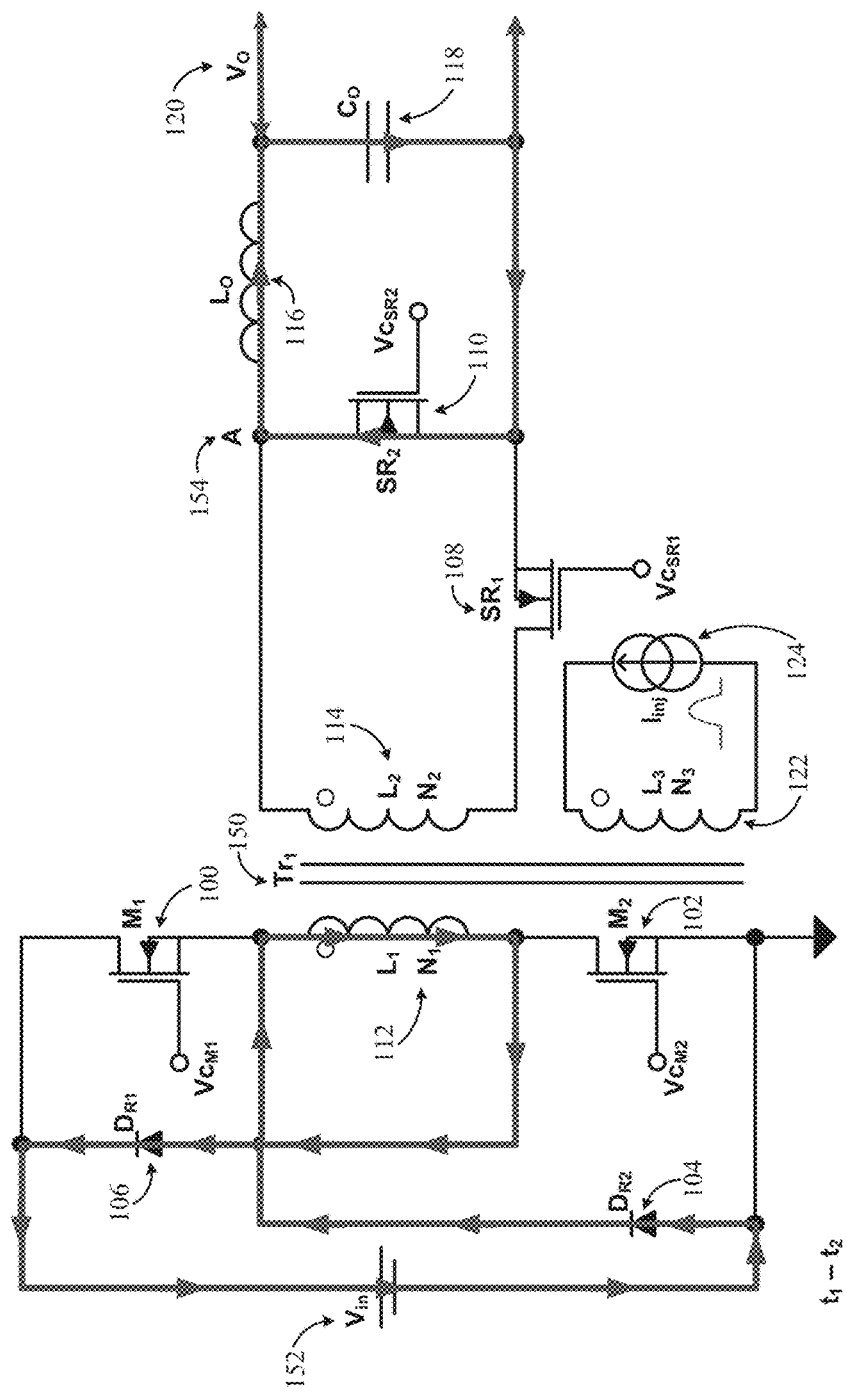
FIG. 3A shows the topology of FIG. 1A with the current flow in the time interval; t1-t2.
Figure 3B:
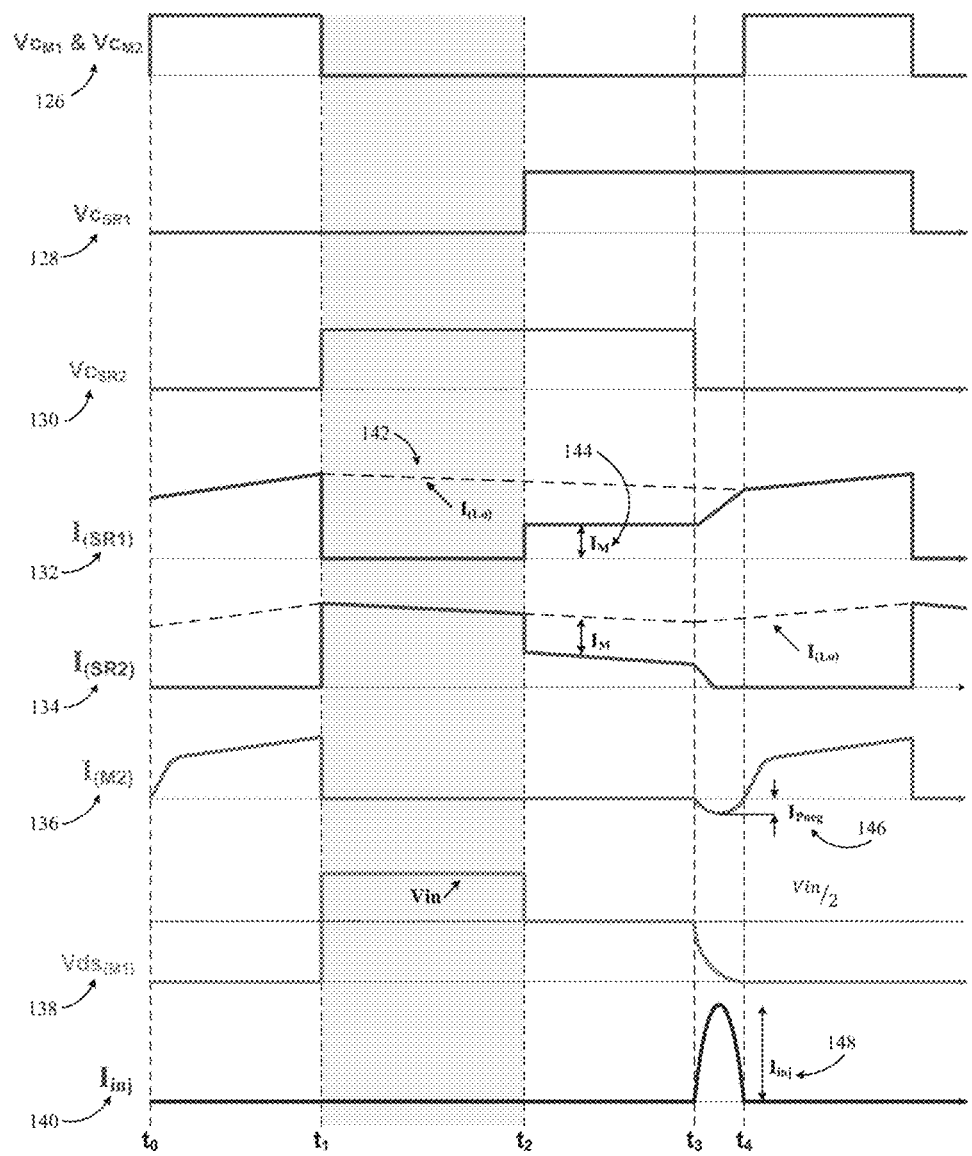
FIG. 3B shows the key waveforms for the topology of FIG. 1A, underlining the t1-t2 time interval.

In the time interval t1-t2 (and in reference to FIGS. 3A and 3B), as shown by the arrows, the magnetizing current of the transformer 150, is flowing in the primary side through (Dr1, 106) and (Dr2, 104) and resets the transformer 150. In the secondary side, the current through (Lo, 116) is flowing through (SR2, 110) towards the output. The ripple current through (Lo, 116) is flowing through Co, 118. During this time the energy that has been stored in (Lo, 116) in the previous cycle is being transferred to the output.

Figures 4A, 4C, 4D:
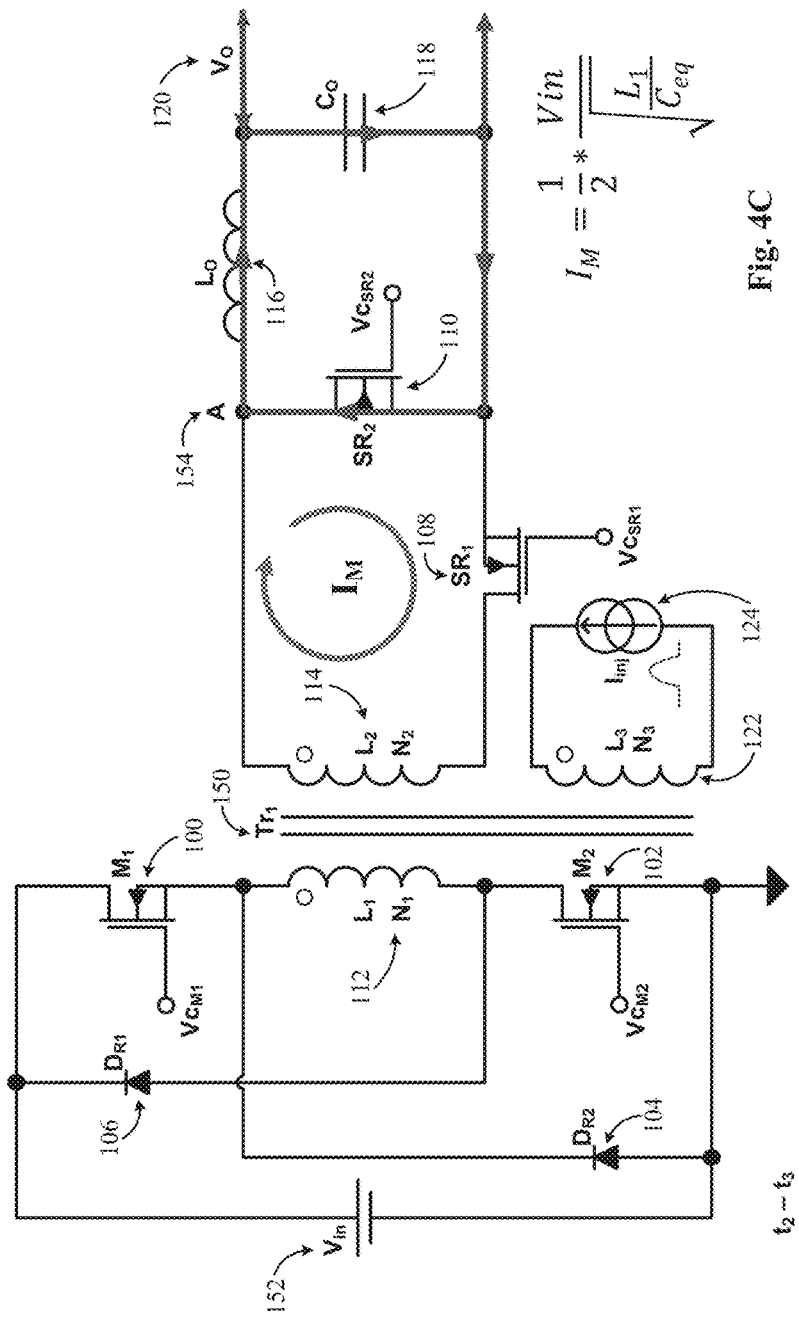
FIG. 4A shows the topology of FIG. 1A with the current flow in the time interval t2-t3.
FIG. 4C presents the equation according to which IM is calculated.
FIG. 4D presents the equation according to which Ceq is calculated.
Figure 4B:
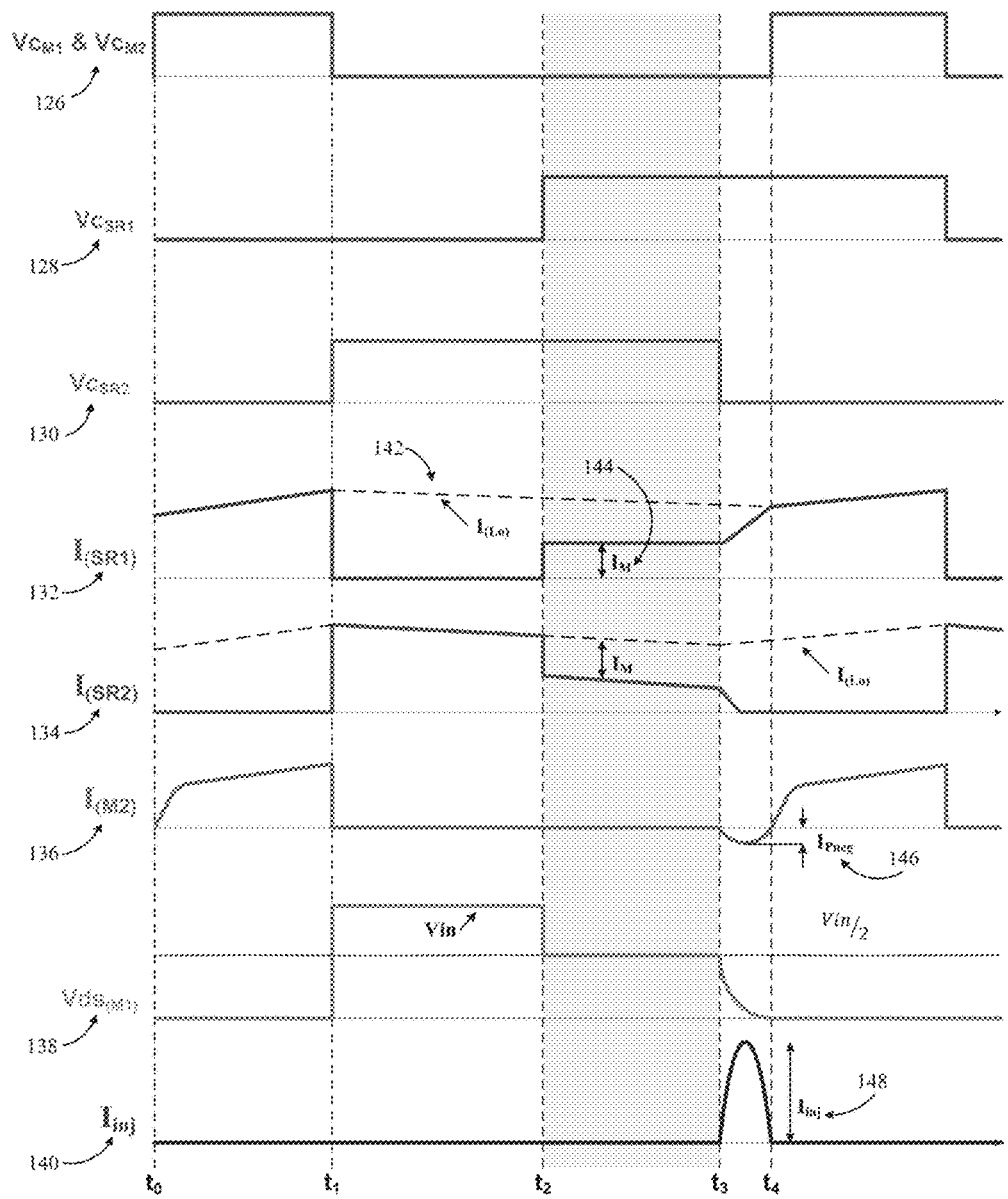
FIG. 4B shows the key waveforms for the topology of FIG. 1A, underlining the t2-t3 time interval.

In the time interval t2-t3 (and in reference to FIGS. 4A and 4B), after the reset cycle (t1-t2) the energy stored in the parasitic capacitance of M1 and M2 is converted to the magnetizing current IM circulating in the secondary side. The amplitude of the magnetizing current resulting from harvesting the energy of the parasitic capacitance of M1 and M2 is described in the Equation of FIG. 4C. The equivalent parasitic capacitance Ceq is expressed in FIG. 4D. There, the CTrp represents the parasitic capacitance of the transformer reflected across the primary winding. The current IM is circulating through SR2, and is of the opposite polarity as compared to the current that flows through (Lo, 116). The resulting current through (SR2, 100) has therefore lower, reduced an amplitude than the current that flown through (SR2, 110) during the previous time interval (t1-t2). In particular, the value of the current through (SR2, 110) in the time interval (t2-t3) is reduced by the value of the current IM, which is the negative magnetizing current. In the event IM is larger than the current flowing through Lo during the time interval (t2-t3), the current through SR2 will become negative and SR2 will turn off at zero current conditions, while the excess current flowing through SR2 (defined as the amount of current exceeding the output current level, I(Lo), 142, will be pushed back into the primary winding to discharge the parasitic capacitance across M1 and M2 and create zero voltage switching conditions.

Figures 5A, 5C:
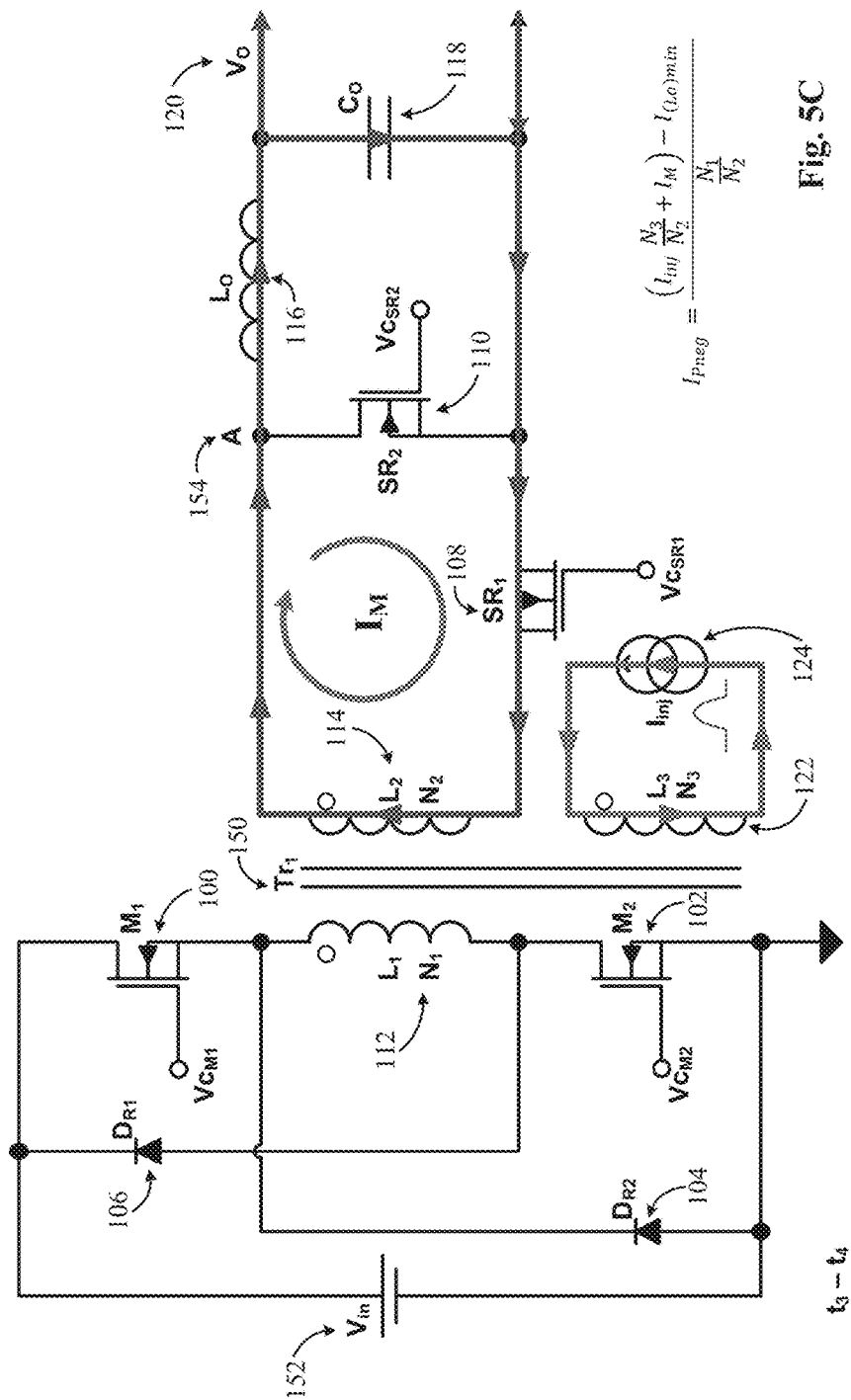
FIG. 5A shows the topology from FIG. 1A with the current flow between t3-t4.
FIG. 5C presents the equation according to which IPneg is calculated.
Figure 5B:
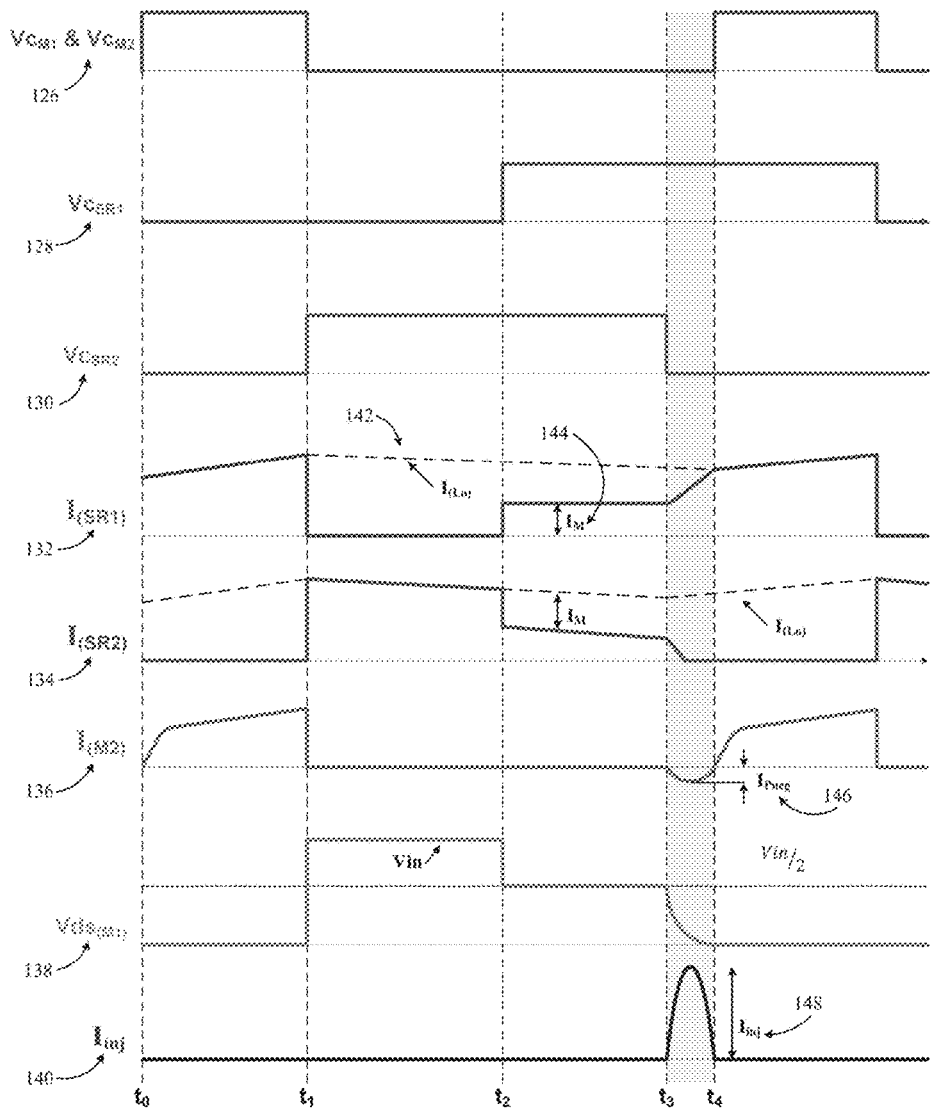
FIG. 5B shows the key waveforms for the topology of FIG. 1A, underlining the t3-t4 time interval.

Now the time interval t3-t4 is considered (in reference to FIG. 5A and FIG. 5B). At t3, the current injection 124 at the current source circuitry X is activated and the current Iinj is injected in the auxiliary winding 122. The current Iinj can configured to assume substantially any shape, and is presented in the example of FIG. 5B in a half-sinusoidal shape (which may be preferred under some conditions, as a skilled artisan will readily recognize). The current Iinj, injected into the auxiliary winding 124, flows into the secondary winding 114, and has the same polarity (the same sign) as the current IM. The current flowing through SR2 represents the difference between the current flowing through (Lo, 142) and the sum of the currents IM and Iinj. By design, the aggregate of IM and Iinj (that is, IM+Iinj) is higher than the current flowing through Lo. Accordingly, the current through (SR2, 110) will reach a zero level at the time when the SR2 turns off. The difference between the (IM+Iinj) and the current through Lo will flow into the primary winding and discharge the parasitic capacitance across (M1, 100) and (M2, 102) towards zero, thereby creating zero voltage switching conditions at the time when (M1, 100) and (M2, 102) turn on. The Equation for calculation of the amplitude of the current flowing into the primary is presented by (IPneg, 146) in FIG. 5C. The voltage across the primary switchers will be reduced/decayed to zero at a moment of time somewhere between t3 and t4.

As a skilled artisan will readily appreciate, the current implementation of the method of operation results in operation of the converter in a true soft switching mode. This general methodology substantially corresponds to the situation when the injection of the external current injection (described in US 2016/0094137 as being injected into the node A, 154) is carried out here with the use of a current injection source into an auxiliary winding of the transformer rather than into the switching node (A, 154).

Specific details of the method depend on how the current injection circuit "X" is implemented. Some of related and alternative implementation are now discussed below.

Example 1 of Specific Implementation

Figure 6A:
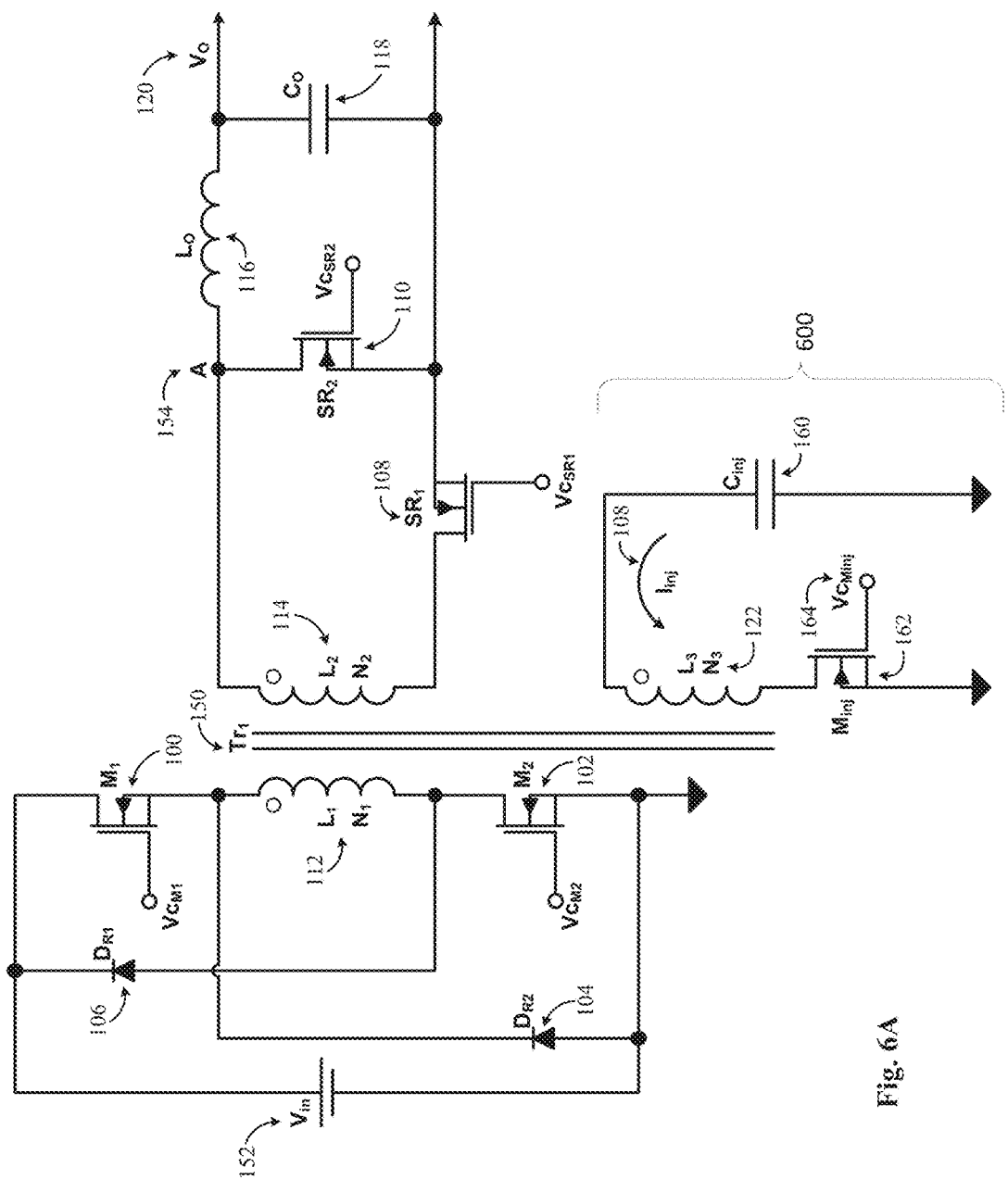
FIG. 6A schematically illustrates two transistors single ended forward with a preferred type of current injection formed by a capacitor and a Minj switch.

FIG. 6A present one embodiment of the current injection circuitry "X", labelled as 600 in FIG. 6A. It includes a switching element (Minj, 162) controlled by a control signal (VcMinj, 164) that is connected with the drain to the non-dot terminal of the current injection winding 122. A capacitor (Cinj, 160) is connected to the dot end of the current injection winding 122. During the time when (M1, 100) and (M2, 102) are conducting, the capacitor (Cinj, 160) is charged with voltage VcInj=Vin*N3/N1. (Here, $N_m$ represents the number of turn in an m-th winding) The value of the capacitor is chosen to be sufficiently large to ensure that the voltage ripple across this capacitor is smaller than the steady state level of voltage given by VcInj.

Figure 6B:
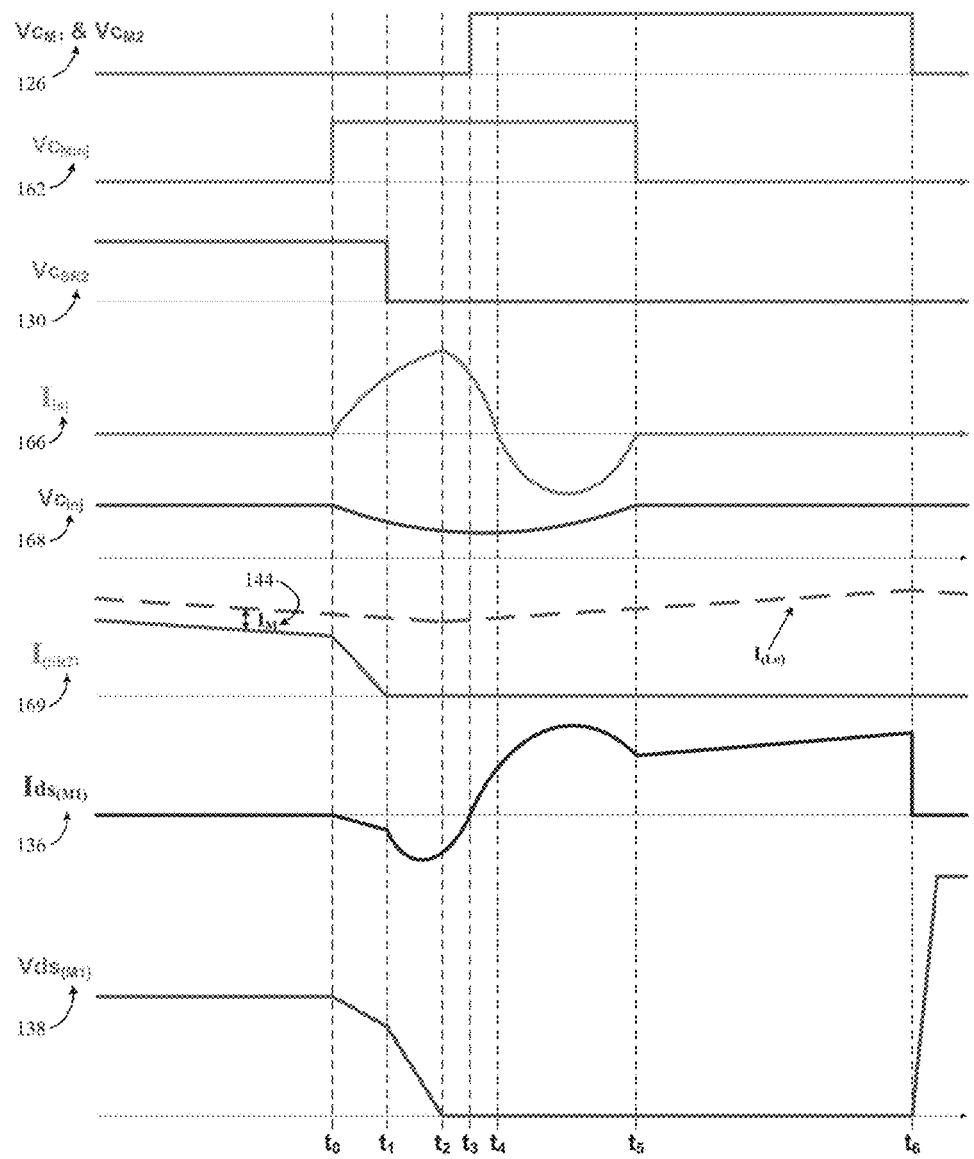
FIG. 6B shows the key waveforms for the topology of FIG. 6A.

The mode of operation of the two transistor forward converter with the current injection circuit implemented as shown FIG. 6A is presented in FIG. 6B.

The waveforms described in FIG. 6B are: (VcM1 & VcM2, 126); (VcMinj, 162); (VcSR2, 130); (Iinj, 166); (VCinj, 168); I(SR2) 134; I(Lo), 169; Ids(M1), 136, and Vds(M1), 138.

At t0, current injection switch Minj is turned on. The Cinj, 160, starst discharging through the current injection winding 122.

At t1 the current injection reflected to the secondary winding 114 reaches an amplitude that is higher than the current through SR2 at the moment t1. The current through (SR2, 110) reaches zero and SR2 can be turned off at zero current conditions.

Between t1 and t2 (that is, in the time interval t1-t2), the magnetizing current (IM, 144) and the injection current, 166, as reflected into the winding 114 will provide the current required by (Lo, 116). The difference between the sum of (the injected current 166 and the magnetizing current (IM, 144)) and the current thorough (Lo, 116) will reflect into the primary side in a form of a current flowing through the primary winding L1, 112 towards the positive end of the input voltage source, thereby discharging the parasitic capacitance of M1 and M2 towards zero. At t2 the voltage across M1 and M2 reaches zero.

Between t1 to t2, the current injection 166 continues to increase until the voltage across M1 and M2 reaches zero. At that time, the voltage across the current injection winding 127 equalizes the voltage level across Cinj, and the current flowing through current injection winding 127 stops increasing. This applies if the ripple across Cinj is very small which does require a large value capacitor for Cinj, 160.

Between t2 to t3 (that is, in the time interval t243), the amplitude of the injection current Iinj starts to decrease. At t3, the main switchers M1 and M2, turn on at zero voltage switching.

Between t3 and t4 (that is, in the time interval t344), when M1 and M2 are fully conducting, the injection current injection (Iinj, 166) starts decaying eventually reaching a zero level at t4.

Between t4 to t5 (in the time interval t4-t5). The injection current is changing its polarity (sign) and starts charging the capacitor (Cinj, 160). At t5, the voltage across the Cinj reaches the same level it had at the moment t0. The injection current reflected in the primary winding, adds to the input current which is reflected from the secondary winding 114.

At t6, the primary switchers M1 and M2 are turned off.

A person of skill in the art will readily appreciate, therefore, that the current injection circuit 600 receives its energy from the primary side when the primary switchers M1 and M2 conduct, that is between the moments of time t4 and t5. The so-received energy is used between t0 to t4 to create a current delivered into the secondary winding that, together with the magnetizing current (IM, 144), exceeds the current flowing through (SR2, 110), thereby forcing the current through SR2 to reach zero at t1 when the SR2 is turned off at zero current conditions.

The amplitude of the current injection can be controlled by adjusting or tuning the time difference (time window) between the moments t0 and t2, and between the moments t0 and t3. By operating the circuitry to "shifting" the curve representing VcMinj towards the left (that is, towards earlier times) and increasing the time difference between t0 and t3, one can increase the peak value of the injection current. The configuration of the converter of FIG. 6B also has the advantage of being "self-adjusting", in that the time at which the voltage across the switching elements is zero and the current injection does not increase anymore can be varied. The self-adjusting feature of this circuit is obtained only if the ripple across Cinj is smaller than the steady state voltage across Cinj.

The possibility to control the peak value of the injection current and the self-adjusting feature are two key advantages of this circuit.

Further, the energy from Cinj together with the magnetizing current (IM, 144) provides the current required by Lo between t1 and t2. The aggregate of the injection current reflected in the secondary side and the magnetizing current minus the current through (Lo, 116) reflects into the primary winding to discharge the parasitic capacitance across M1 and M2 to zero.

The magnetizing current and the injection current reflected in the secondary winding 114 will also charge the parasitic capacitance across SR2 when SR2 turns off. Charging a parasitic capacitance with a current source eliminates any ringing and spikes across SR2 at a turn off, providing another operational advantage of this methodology.

One can readily appreciate that operation of the embodiment of the invention discussed in reference to FIGS. 6A, 6B produces an important outcome: The primary switchers turn on at zero voltage and the secondary switchers turn off at zero current and the charge of the parasitic capacitance(s) across the SR2 is done by two current sources in parallel while eliminating any ringing and spikes across it.

Example 2 of Specific Implementation

Figure 7:
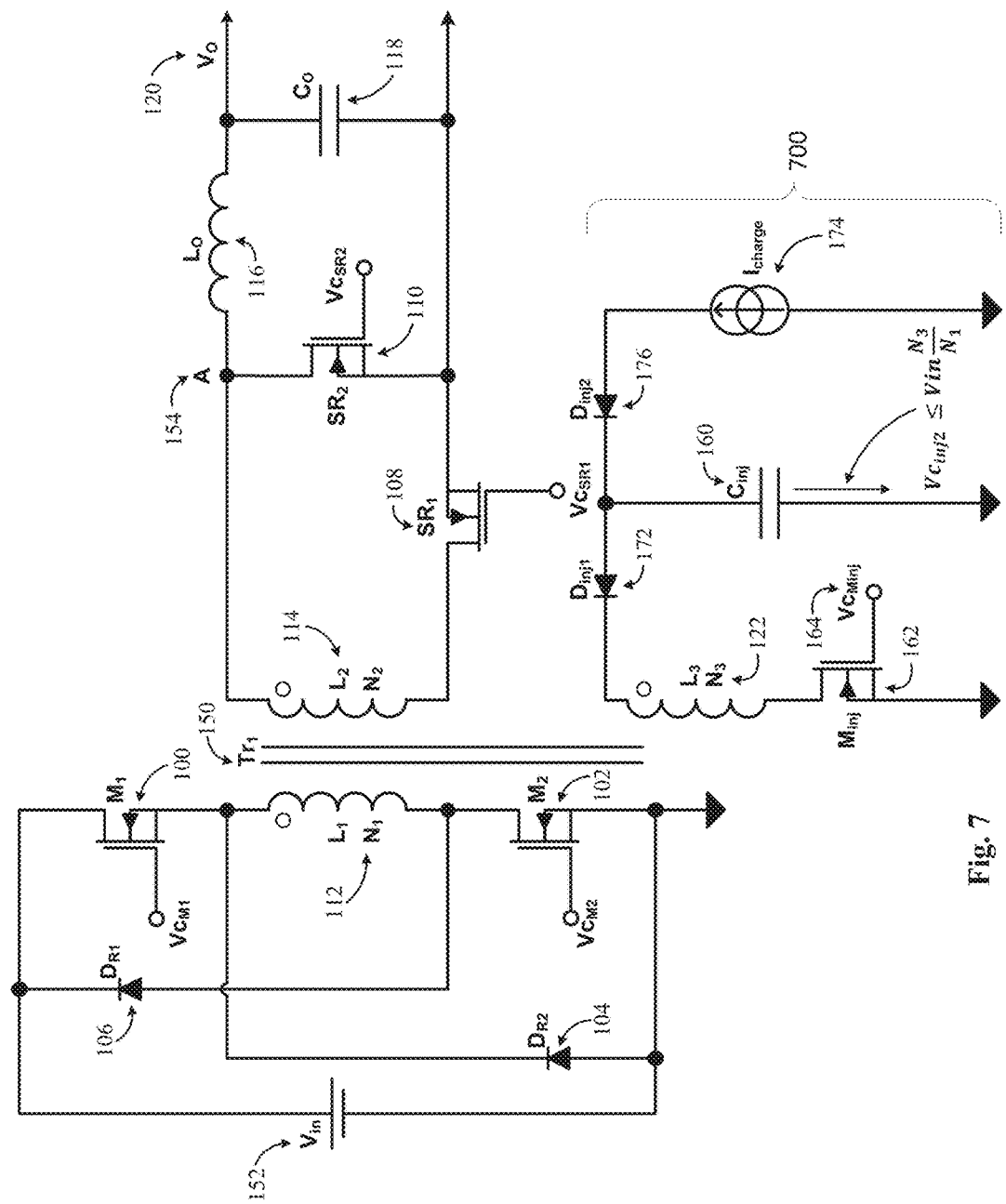
FIG. 7 schematically illustrates two transistors single-ended forward topology with an alternative type of current injection (configured to provide energy from another source other sources rather than from the transformer Tr)

In FIG. 7 is presented another type of the current injection circuit. In this new implementation 700 of the current injection circuit, shown in a generalized way, the energy is provided from (Cinj, 160), which is charged from a current source 174 via a diode (Dinj2, 176). The Cinj capacitor can be charged from a current source or a voltage source. For a proper operation of the current injection circuit the voltage across (Cinj, 160) has to be equal or smaller than Vin*N3/N1.

The current injection delivered by (Cinj, 160) comes through the diode (Dinj1, 172). The diode is required to prevent the charge of Cinj during the time the primary switchers are conducting.

This generalized circuit has several operational advantages: First, one can use other sources of energy to charge (Cinj, 160). The energy to charge (Cinj, 160) can come from harvesting energy from parasitic elements such as leakage inductance or other parasitic elements. This circuit has also some flexibility with respect to the voltage across Cinj. The current injection circuit can receive also some energy from other sources as long as the voltage across (Cinj, 160) is smaller than Vin*(N3/N1). If other energy sources are used to charge (Cinj, 160), the energy necessary to charge Cinj from the input voltage source (Vin, 152) will be reduced.

Figure 8A:
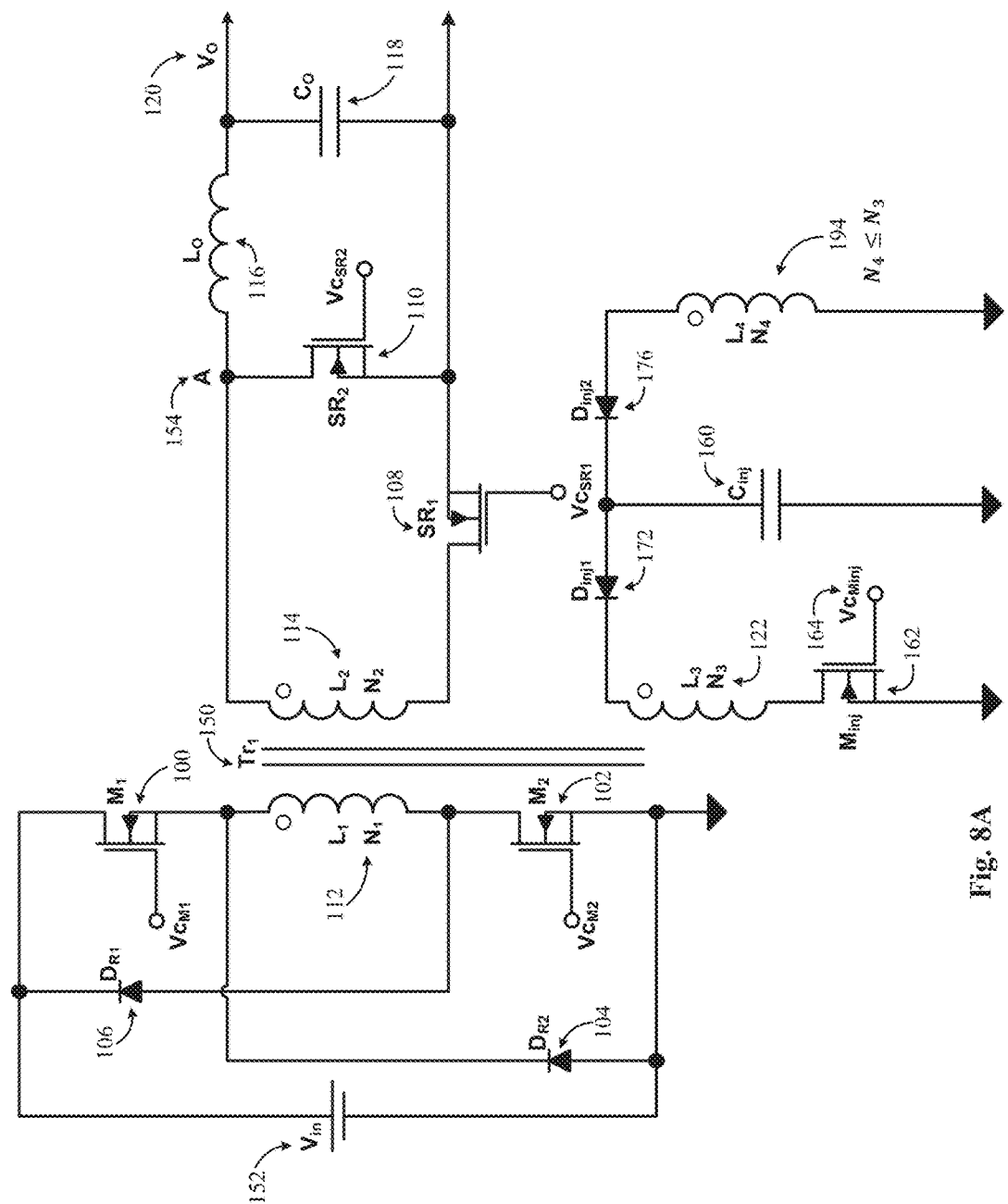
FIG. 8A schematically illustrates two transistors single-ended forward topology with an alternative type of current injection (configured to provide different energy from the transformer through a different winding and in which the voltage across Cinj can be custom set)

In FIG. 8A illustrates a specific implementation of the current injection circuitry 700 of FIG. 7, where the energy is delivered from the main transformer via another winding (L4, 194). For a proper operation of this circuit, the condition of N4≤N3 has to be satisfied The mode of operation of the circuit is illustrated in FIG. 8B.

Figure 8B:
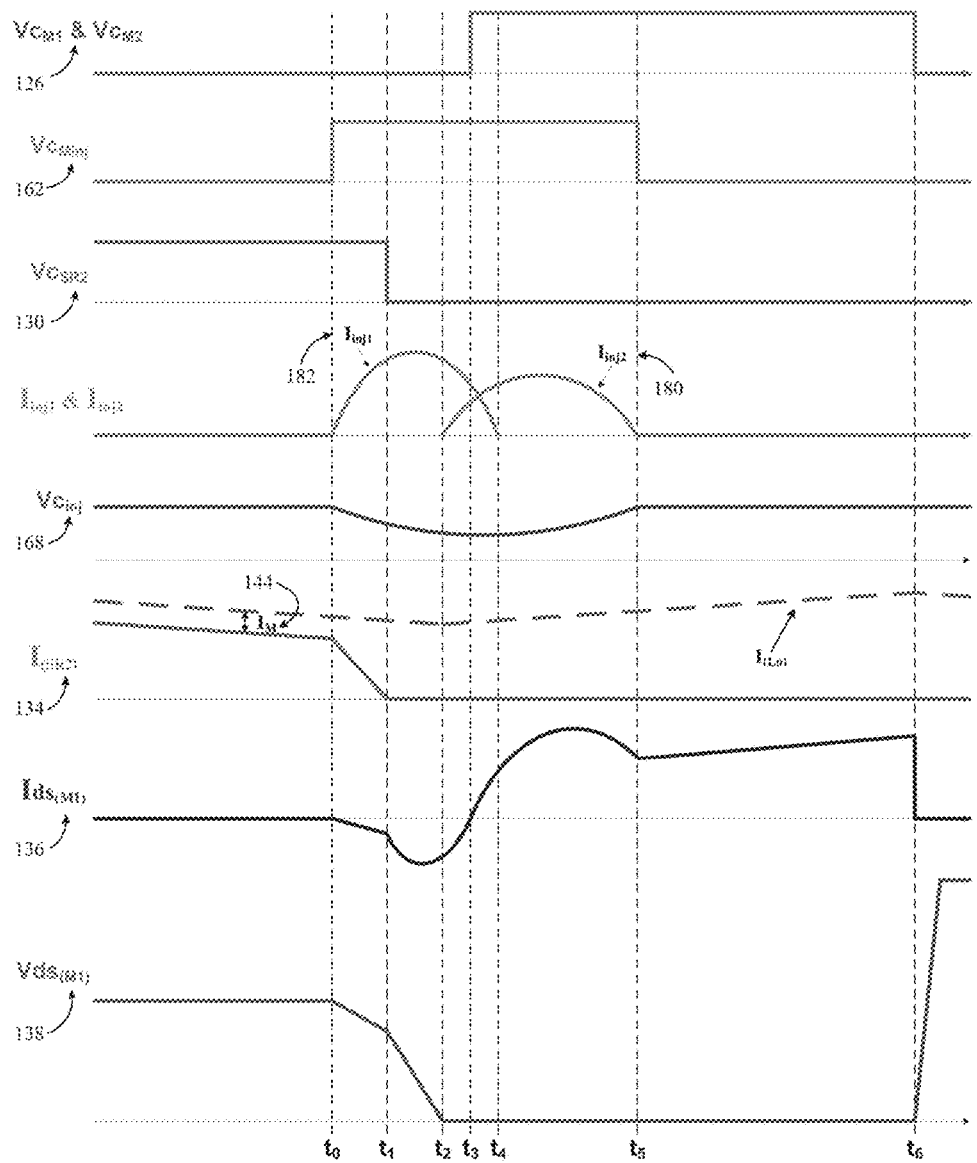
FIG. 8B shows the key waveforms for the topology of FIG. 8A.

The waveforms described in FIG. 8B are: (VcM1 & VcM2, 126), (VcMinj, 162), (VcSR2, 130), (Iinj1, 182), (Iinj2, 180), (Vcinj, 168), (I(SR2), 134), (I(Lo), 169), (Ids (M1), 136), and (Vds(M1), 138).

At t0, current injection switch Minj is turned on. The (Cinj, 160), starts discharging through the current injection winding 122.

At t1, the injection current reflected to the secondary winding together with the magnetizing current (IM, 144), reaches the amplitude that is higher than the current through SR2 at t1. The current through (SR2, 110), reaches zero and SR2 can be turned off at zero current conditions.

Between t1 and t2, the magnetizing current and the injection current (Iinj1, 182), reflected into the secondary winding 114 will provide the current required by (Lo, 116). The difference between the sum of the injected current, the magnetizing current, IM, and the current through (Lo, 116), will reflect into the primary flowing through the primary winding (L1, 112) towards the positive end of the input voltage source 152, thereby discharging the parasitic capacitance of M1 and M2 towards zero. At t2 the voltage across M1 and M2 reaches zero.

Between t1 to t2, the injected current (Iinj1, 182) continues to increase until the voltage across M1 and M2 reaches zero. At that moment, the voltage across the current injection winding 122 equalizes the voltage level across Cinj and the current passing through the current injection winding, 122 stops increasing. This does apply if the ripple across Cinj is very small, which requires a large value capacitor for (Cinj, 160). At t2 the main switchers M1 and M2, will turn on at zero voltage switching.

At t2 the (Iinj2, 180), starts to build up charging the (Cinj, 160).

Between t2 to t3, the current injection amplitude Iinj1 starts to decrease. Between t3 and t4, when M1 and M2 is in full conduction mode (fully conducting) the current injection (Iinj1, 182) starts decaying reaching the zero level at t4.

Between t4 to t5, the current injection (Iinj2, 180), continues to charge (Cinj, 160) until t5, when (Iinj2, 180) reaches zero.

At t5, the voltage across the Cinj capacitor reaches the same level it had at to. The current injection reflected in the primary winding, adds to the input current which is reflected from the secondary winding 114.

At t6 the primary switchers M1 and M2 are turned off

A skilled artisan will readily appreciate that, in operation, this example of the current injection circuitry receives its energy from the primary side when the primary switchers M1 and M2 conduct, between t2 and t5 through the winding 194. The so-received energy is used between t0 to t4 to create a current into the secondary winding that, together with the magnetizing current, exceeds the current flowing through (SR2, 110) forcing the current through SR2 to reach zero at t1 (when the SR2 is turned off at zero current conditions). Further the (Iinj1, 182), reflected in the secondary winding, together with the magnetizing current (IM, 144) delivers the current to the (Lo, 116) until t2. The current, formed by the summation of magnetizing current and the Iinj1, at a level exceeding the current through Lo, will reflect into the primary side to discharge the parasitic capacitance across M1 and M2 towards zero between t1 to t2.

Other current injection circuits can be derived by using the key concepts previously described without deviating from the scope of this patent.

Example 3 of Specific Implementation ("Active Clamp Forward" Topology)

The embodiments of a method for operating a power converter to create truly soft switching, so far discussed as applied to a two transistors forward configuration, can also be applied to other single-ended forward topologies. One of such topology is the active clamp forward topology described in FIG. 9A. The current injection circuit utilized in this example is the current injection circuit 600 described in connection with FIG. 6A. (The current injection circuit(s) form FIGS. 7 and 8A can be also utilized.)

Figure 9A:
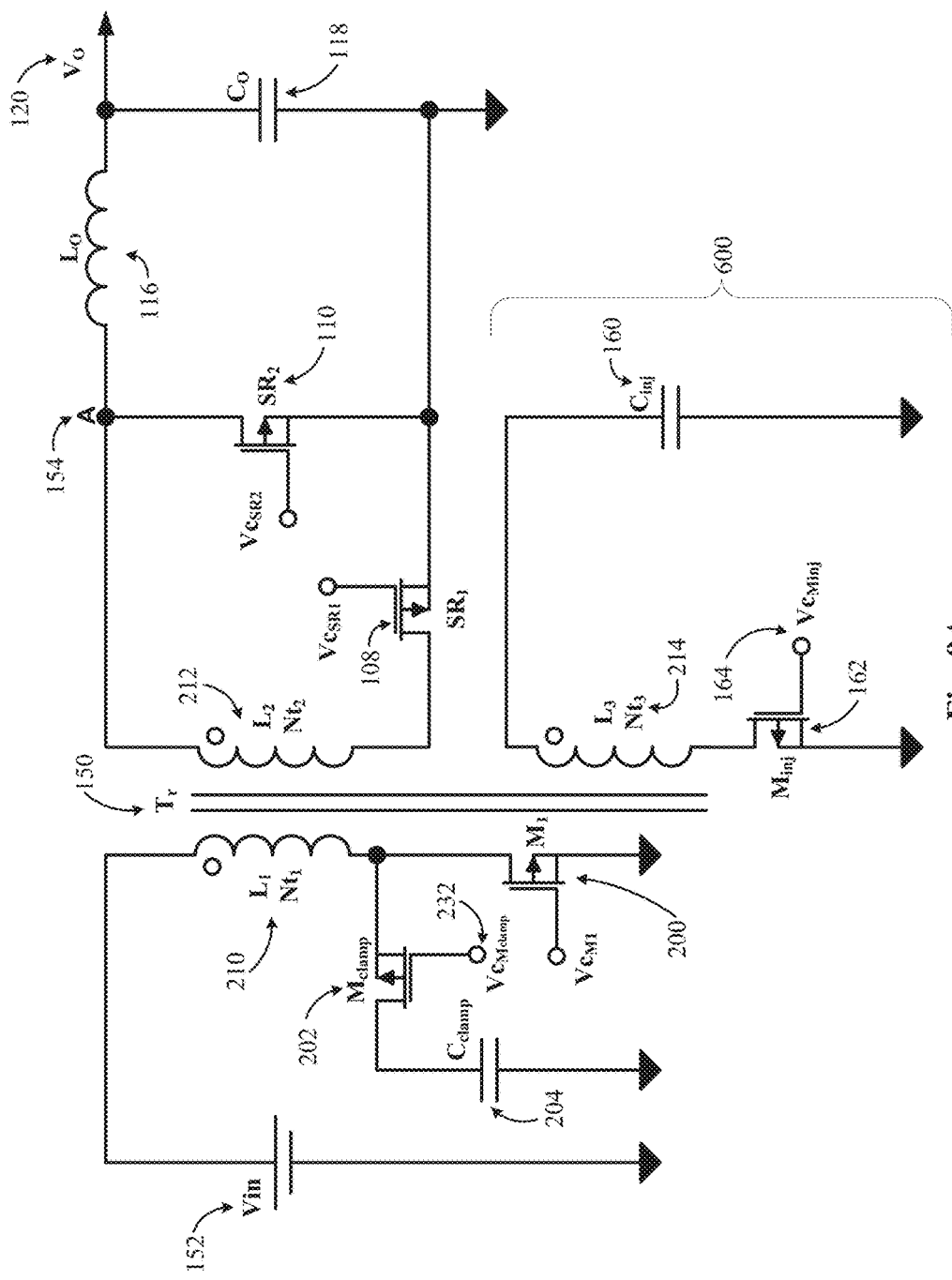
FIG. 9A schematically illustrates an active clamp single-ended forward topology with current injection in the transformer.

FIG. 9A presents a forward topology with active clamp employing a current injection in an auxiliary winding, which is well coupled with the rest of the winding in the transformer. The forward topology with active clamp contains a main switch (M1, 200), controlled by a signal (VcM1, 204); an active clamp switch (Mclamp, 202), controlled by a signal (VcMclamp, 232); a transformer (Tr, 208), having a primary winding (L1, 210), a secondary winding (L2, 212), and an auxiliary winding (L3, 214). On the secondary side, there are two synchronized rectifiers (SR1, 218) and SR2, 216), referred to respectively as the forward rectifier and the freewheeling rectifier. The output filter formed by the output inductor (Lo, 220) and capacitor (Co, 222) is placed across the switching node A, 254 and the ground. The output voltage (Vo, 230) is further connected to the load (not shown).

Figure 9B:
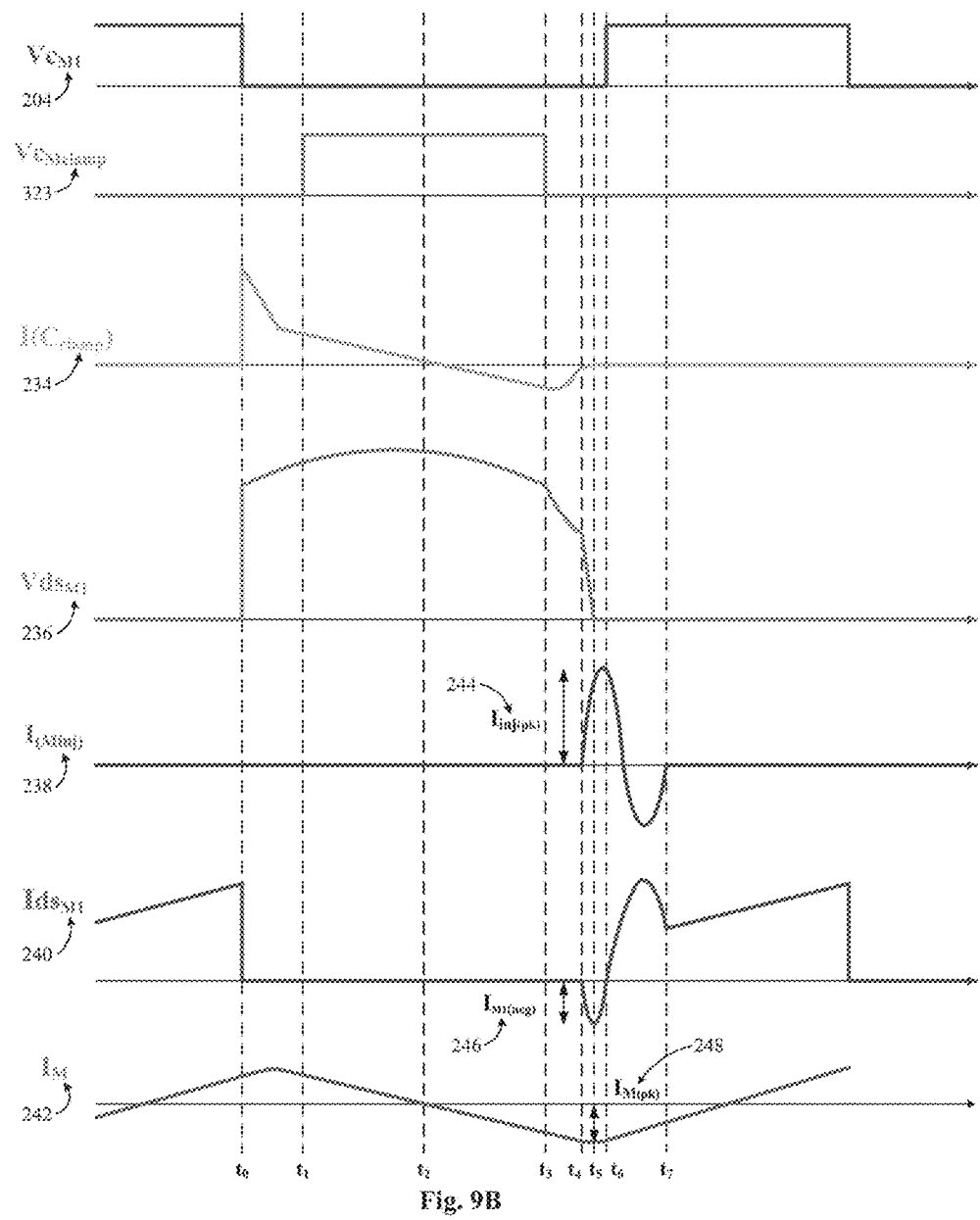
FIG. 9B shows the key waveforms for the topology of FIG. 9A.

In FIG. 9B are presented the key waveforms of the converter: (VcM1, 204), which is the control signal for M1; the control signal for the clamp (VcMclamp, 232); the current through the clamp (I(clamp), 234); the voltage across M1 (Vds(M1), 236); the current injection (I(Minj), 238); the current through the main switch (Ids(M1), 240); and the magnetizing current (IM, 242).

Several time-intervals of operations can be observed here.

Figure 10A:
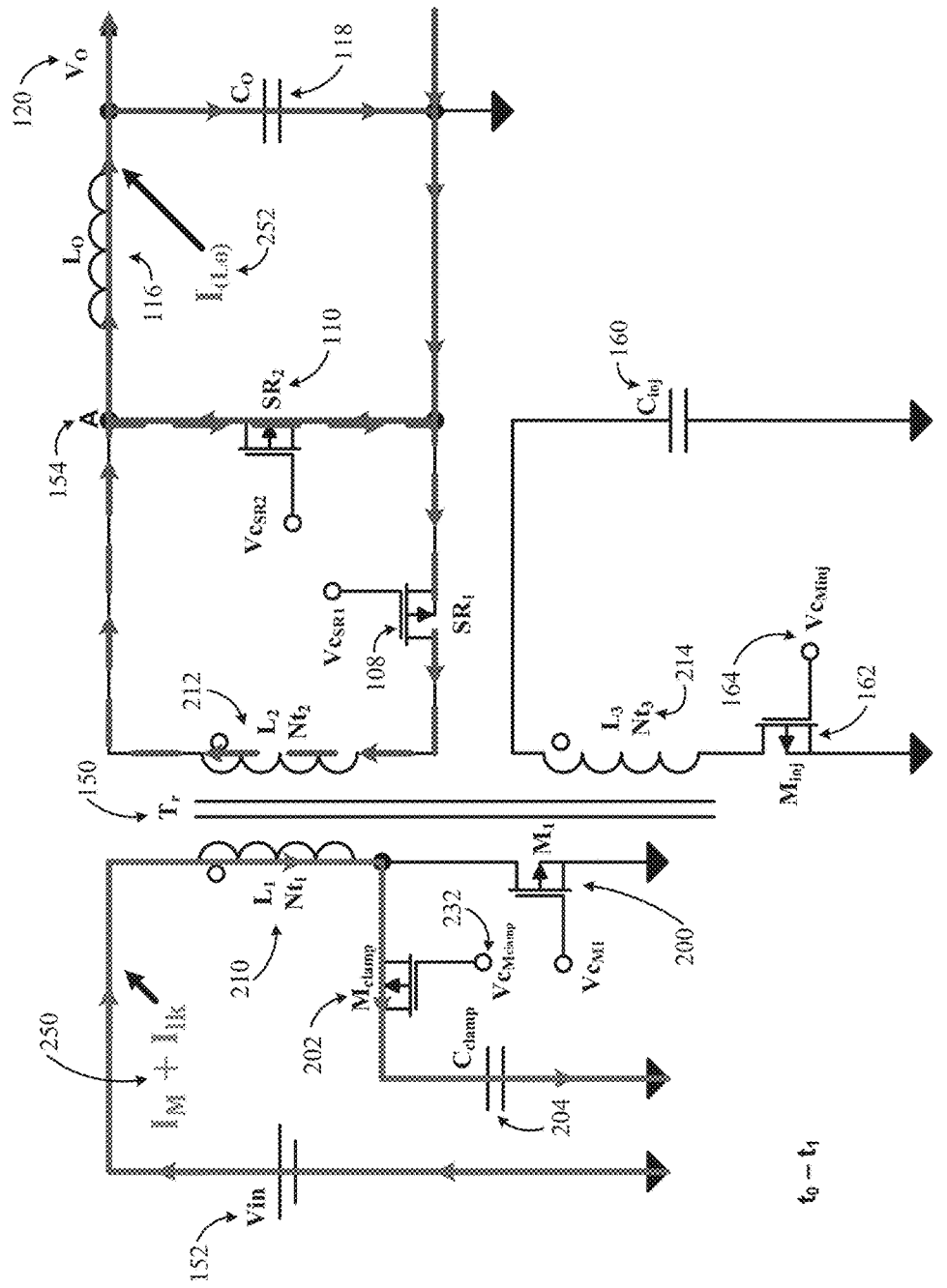
FIG. 10A shows the topology of FIG. 9A with the current flow during the time interval t0-t1.
Figure 10B:
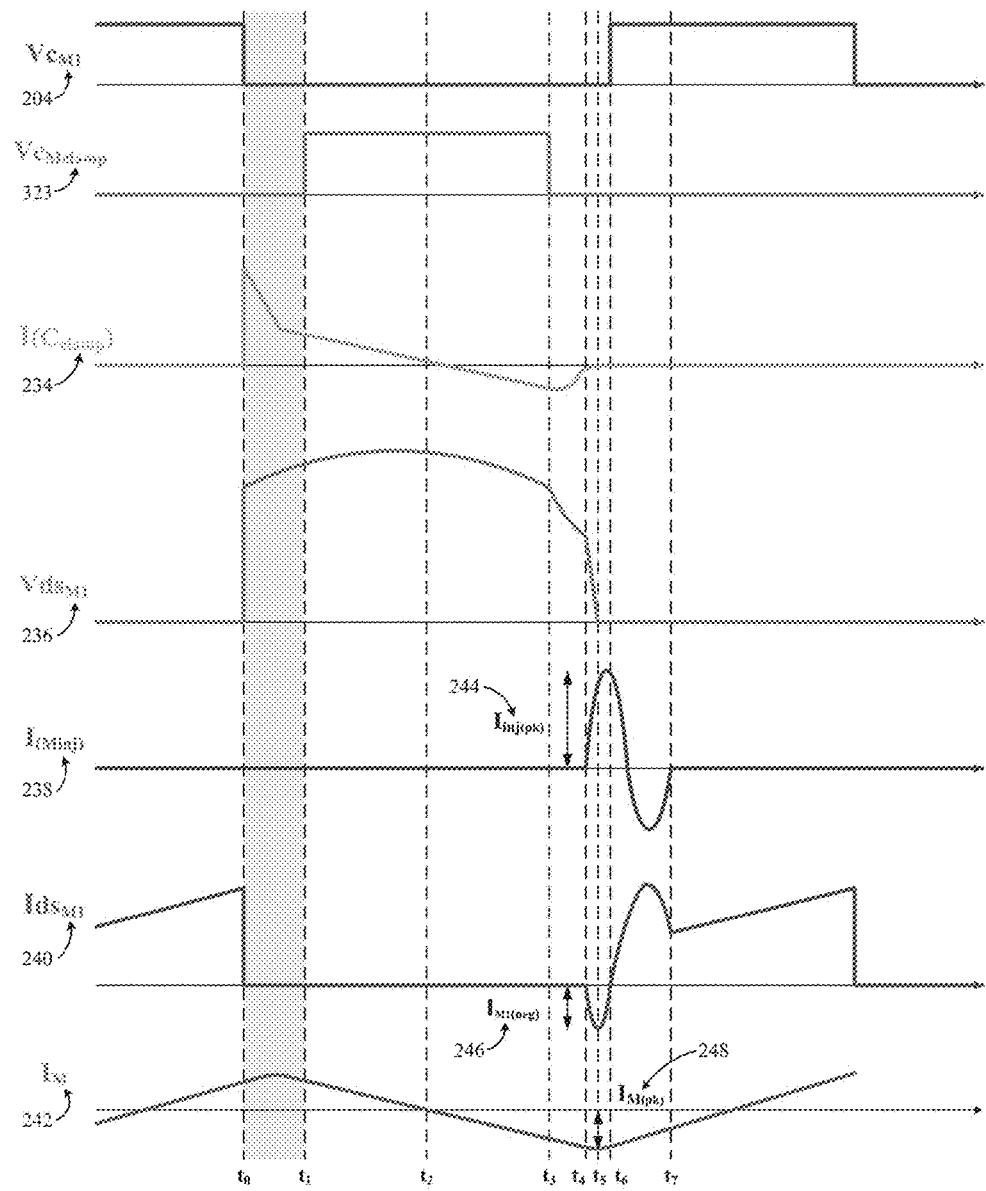
FIG. 10B shows the key waveforms for the topology of FIG. 9A, underlining the t0-t1 time interval.

In reference to FIGS. 10A, 10B) and during the time interval t0-t1, the main switch M1, 200 turns off at t0. The leakage current (Ilk, 250) reflected in the primary and the magnetizing current (IM, 242) starts flowing through the body diode of (Mclamp, 202). In the secondary, the leakage current (Ilk, 250) will continue to flow for a short time until the voltage in A, 254 collapse to zero and short after, SR2, 216 is turned on.

Figure 11A:
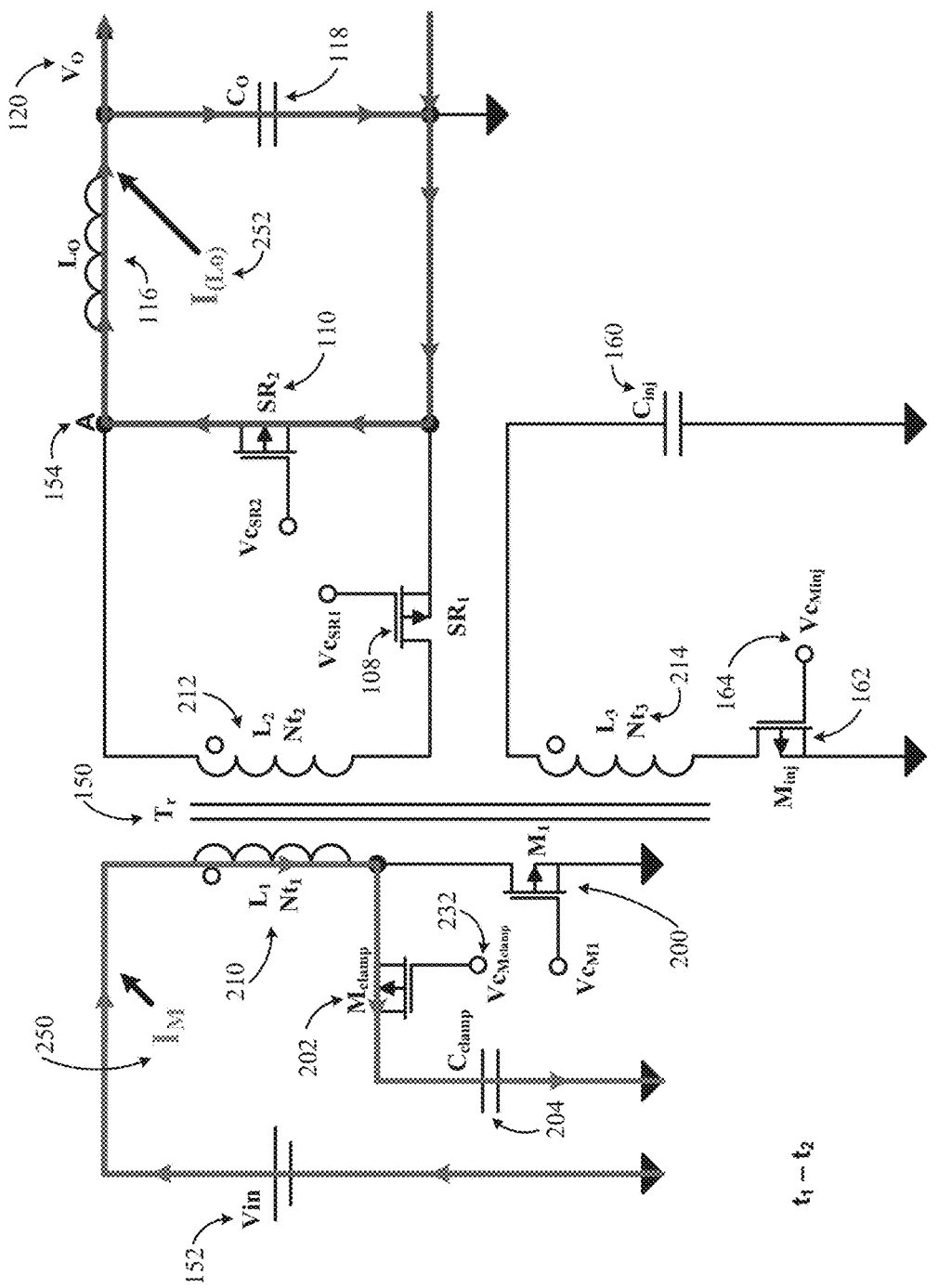
FIG. 11A shows the topology of FIG. 9A with the current flow during the time interval t1-t2.
Figure 11B:
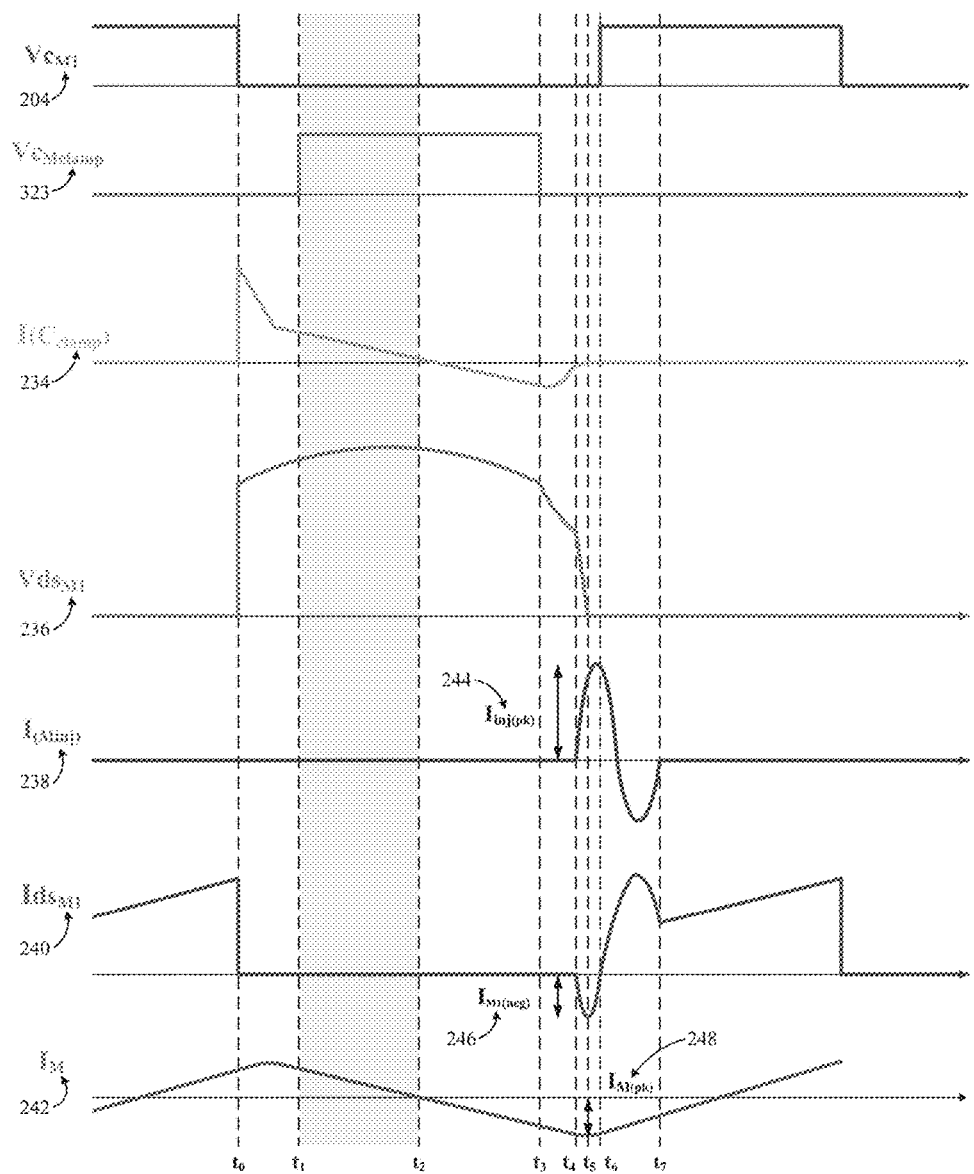
FIG. 11B shows the key waveforms for the topology of FIG. 9A, underlining the t1-t2 time interval.

During the time interval t1-t2 (as shown in FIGS. 11A, 11B): At t1, the active clamp switch Mclamp turns on. The magnetizing current (IM, 242), will continue to flow through (Mcclamp, 202) charging the clamp capacitor, see 204. In the secondary, the current through the output inductor 252 continues to flow through (SR2, 216).

Figure 12A:
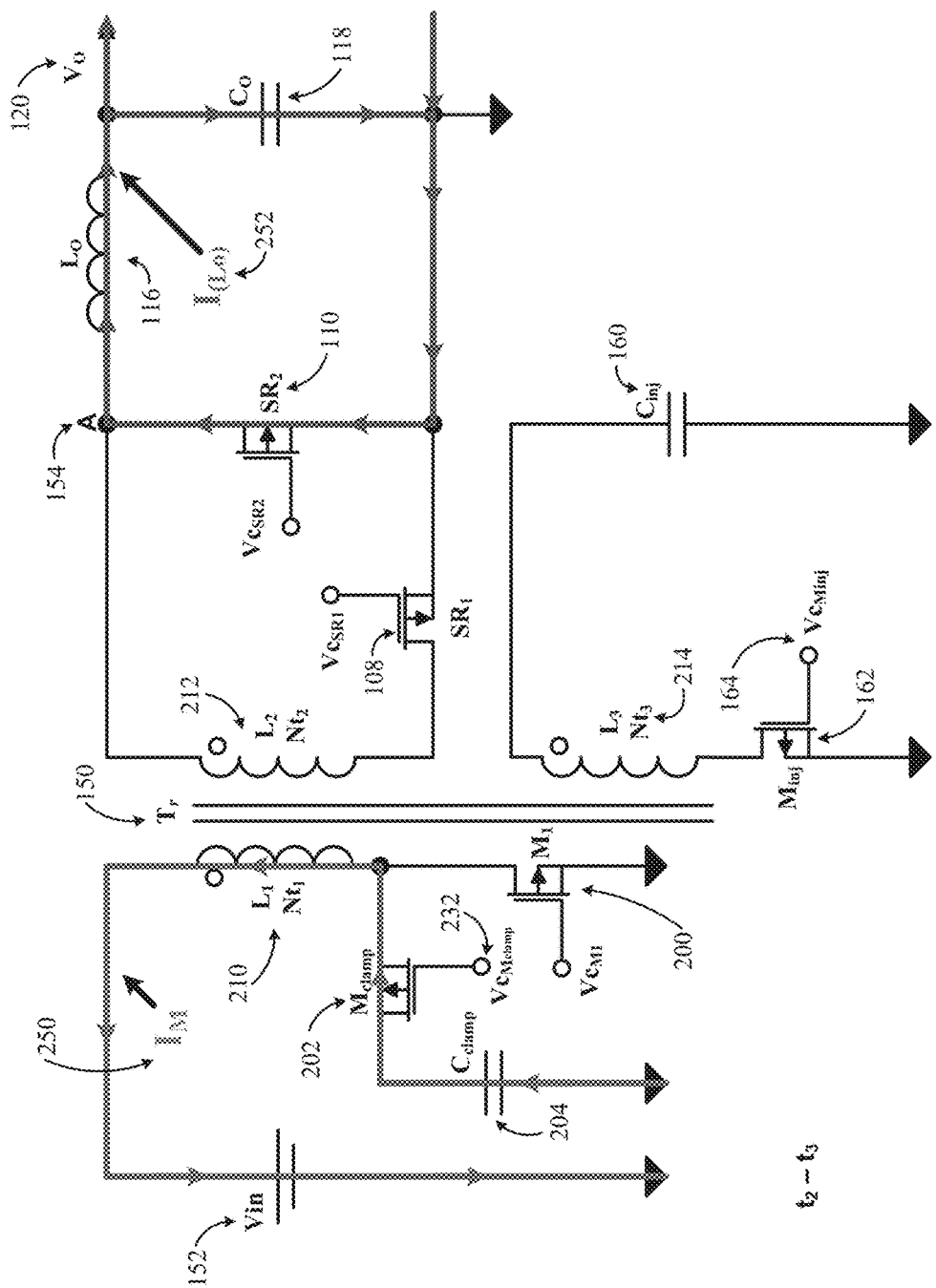
FIG. 12A shows the topology of FIG. 9A with the current flow for the time interval t2-t3.
Figure 12B:
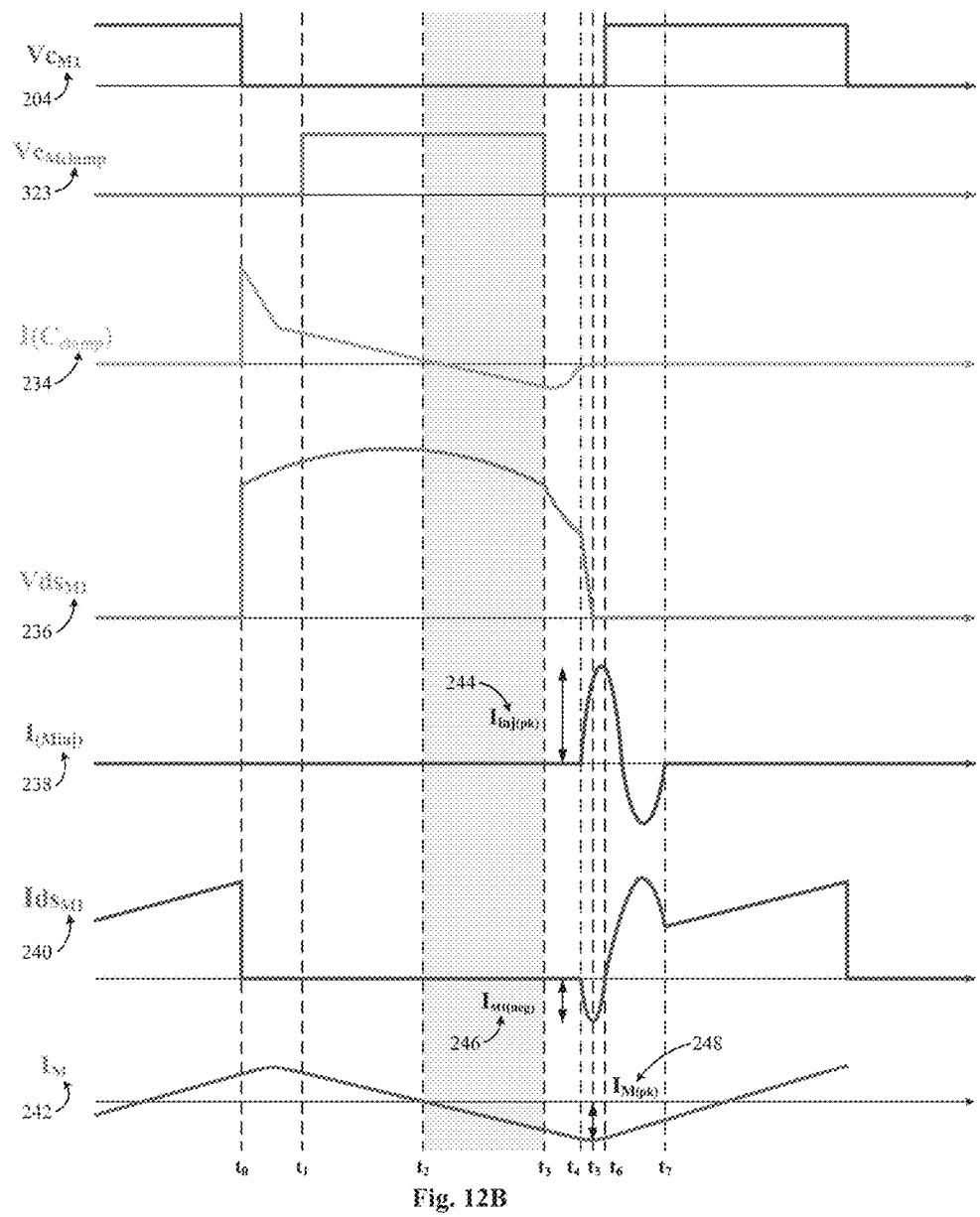
FIG. 12B shows the key waveforms for the topology of FIG. 9A, underlining the t2-t3 time interval.

During the time interval t2-t3 (as shown in FIGS. 12A, 12B): At t2, the magnetizing current reaches zero. After t2, the magnetizing current changes directions and flows back towards the positive polarity of Vin, 206.

Figure 13A:
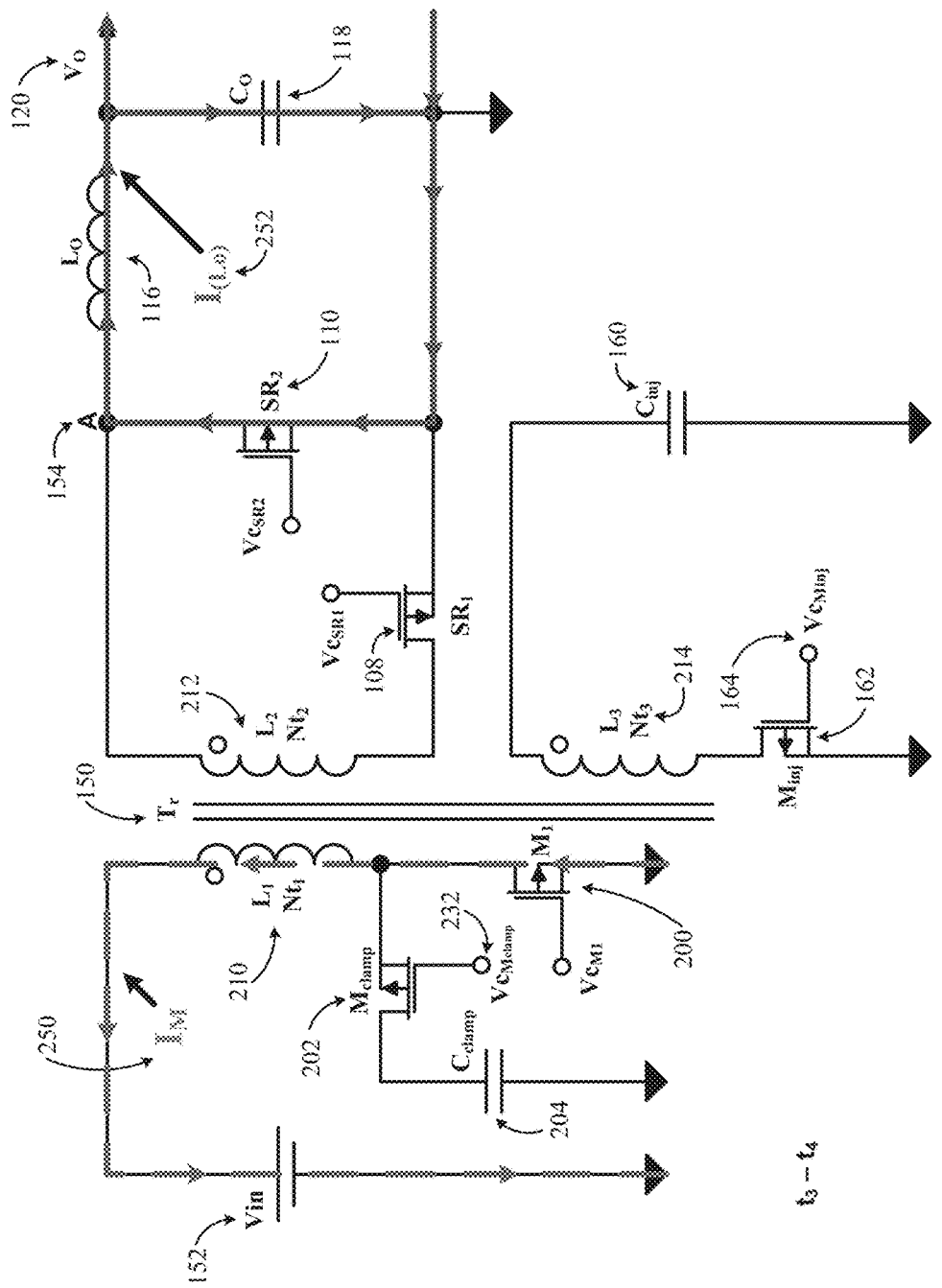
FIG. 13A shows the topology of FIG. 9A with the current flow during the time interval t3-t4.
Figure 13B:
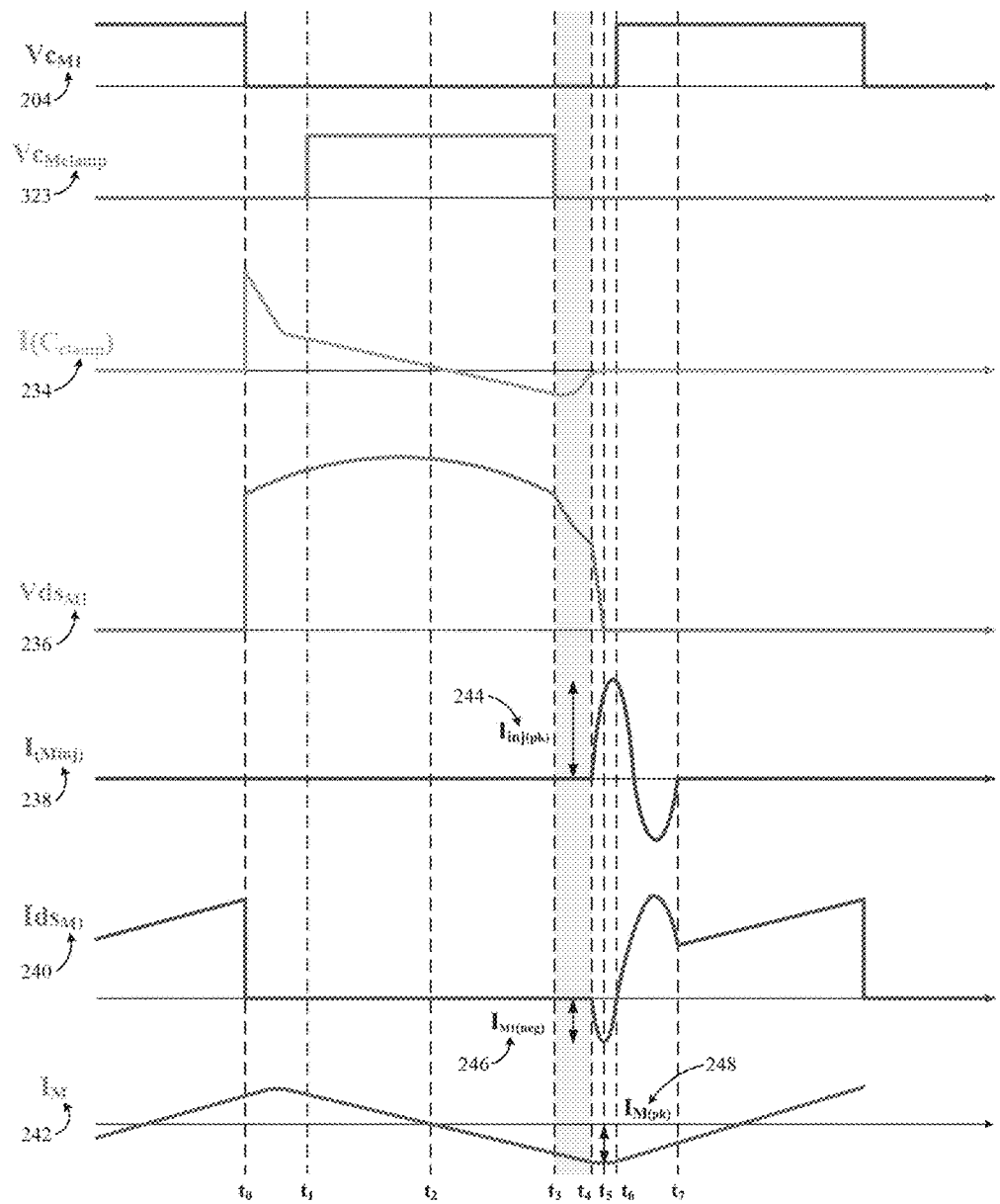
FIG. 13B shows the key waveforms for the topology of FIG. 9A, underlining the t3-t4 time interval.

During the time interval t3-t4 (as shown in FIGS. 13A, 13B): At t3, when the clamp switch (Mclamp, 202) is turned off, the magnetizing current continue to flow via the parasitic capacitances of (M1, 200) and (Mclamp, 2020, and starts to discharge these parasitic capacitances.

Figure 14A:
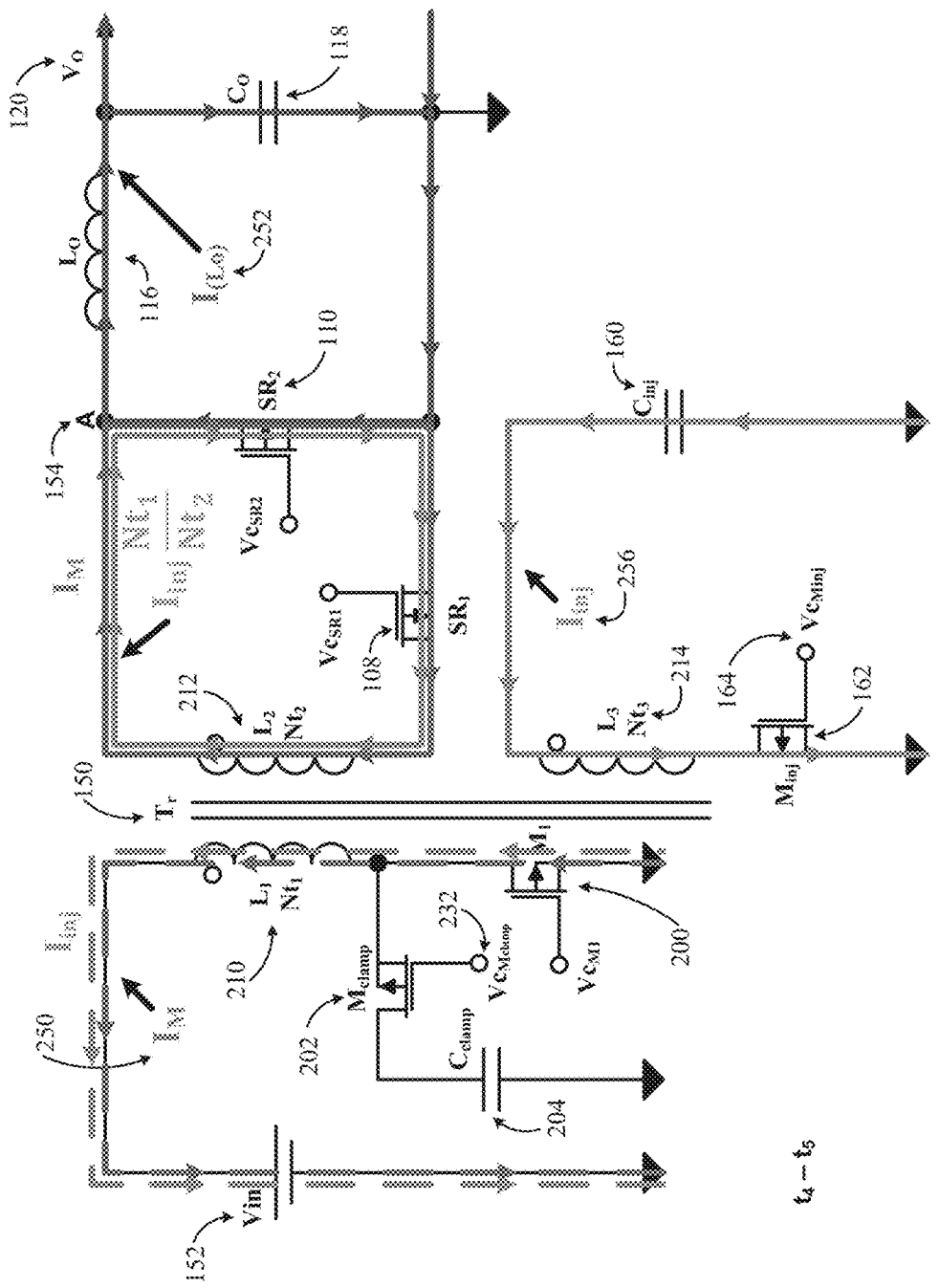
FIG. 14A shows the topology for FIG. 9A with the current flow during the time interval t4-t5.
Figure 14B:
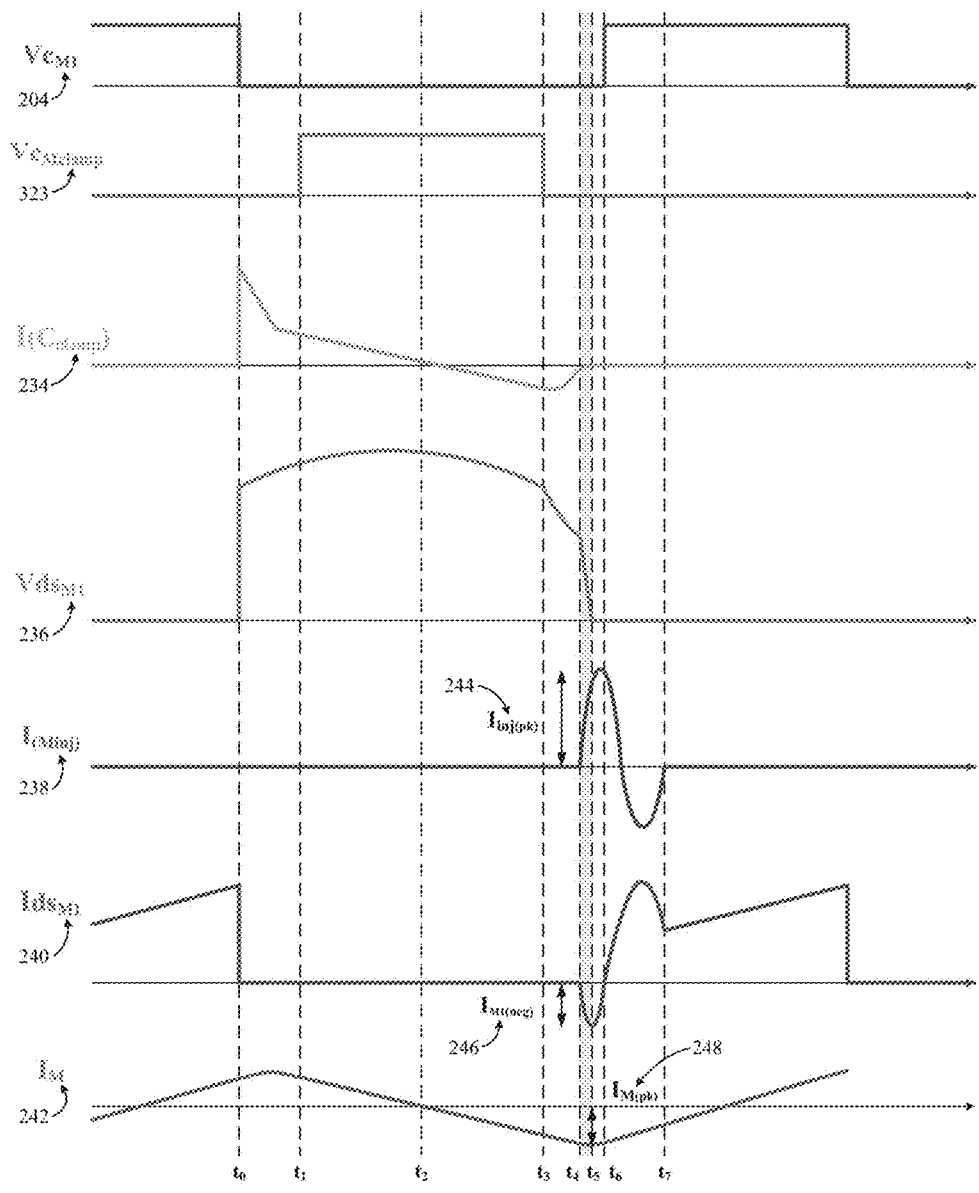
FIG. 14B shows the key waveforms for the topology of FIG. 9A, underlining the t4-t5 time interval.

During the time interval t4-t5 (as is shown in FIGS. 14A, 14B): At t4, the voltage across M1 will reach the level of the input voltage Vin, 206. When that happens, the voltage across the secondary winding 212 turns zero and further is changing its polarity. The magnetizing current starts flowing through the secondary winding 212 and a portion of it still flows through the primary winding 210. The proportion of the split of the magnetizing current between the primary winding 210 and secondary winding 212 is a function of the impedance of the path the magnetizing current is flowing. At t4 the current injection switch (Minj, 226) is turned on and the current injection 238 starts building up reaching its peak at t5, with an amplitude of Iinj(pk), 244.

The magnetizing current that flows into the secondary side, will add up with the injection current flowing into the secondary winding 212 at the time the SR2, 216 is conducting. The injection current that is flowing through the injection winding, 214, will start flowing through the other windings of the transformer 208, favoring the lowest impedance path. When (SR2, 216) is in conduction mode after the voltage across (M1, 200) falls below input voltage (Vin, 206), at t4, the voltage across the winding 212 becomes positive at the dotted terminal of the winding 212 and the current will start flowing through (SR1, 218). While (SR1, 208) and (SR2 216) are conducting, a very low impedance path is created across the secondary winding 212. That causes the most of the current injection and magnetizing current, 242 to flow through the secondary winding 212. The injection current flowing through 212 adds to the magnetizing current which flows through that winding, because the low impedance path created by the simultaneously conduction of SR1, 218 and SR2, 216. The sum of the current injection reflected into the secondary winding 212, plus the magnetizing current flowing along the same path will exceed the level of the current flowing through (SR2, 216) and, as a result, the current through 216 will reach zero sometime between t4 and t5. At that time, the SR2 is turned off. The injection current will continue to flow after SR2 is turned off. After (SR2, 216) is turned off, the low impedance path—while the simultaneous conduction of (SR1, 218) and (SR2, 216)—becomes a high impedance path. The aggregate, of the injection current reflected into the secondary winding 212 and the magnetizing current reflected into the secondary winding 212, is higher than the current flowing through the output inductor (Lo, 220) and the amount of such aggregate current that exceeds the current through (Lo, 220) will start flowing into the primary winding discharging the parasitic capacitance across (M1, 200) and (Mclamp, 202) towards zero. At t5, the voltage across (M1, 200) reaches a zero level. The current through the primary winding reaches a peak negative value at t5, IM1 (neg) 246. Depending on which implementation of the current injection circuit (for example, among those described above) is used, the peak injection current may be reached either after the zero voltage is obtained across M1, or before. Such difference, however, does not affect the principle and/or methodology of operation of a power converter having a single-ended forward topology, and remains within the scope of the invention.

Figure 15A:
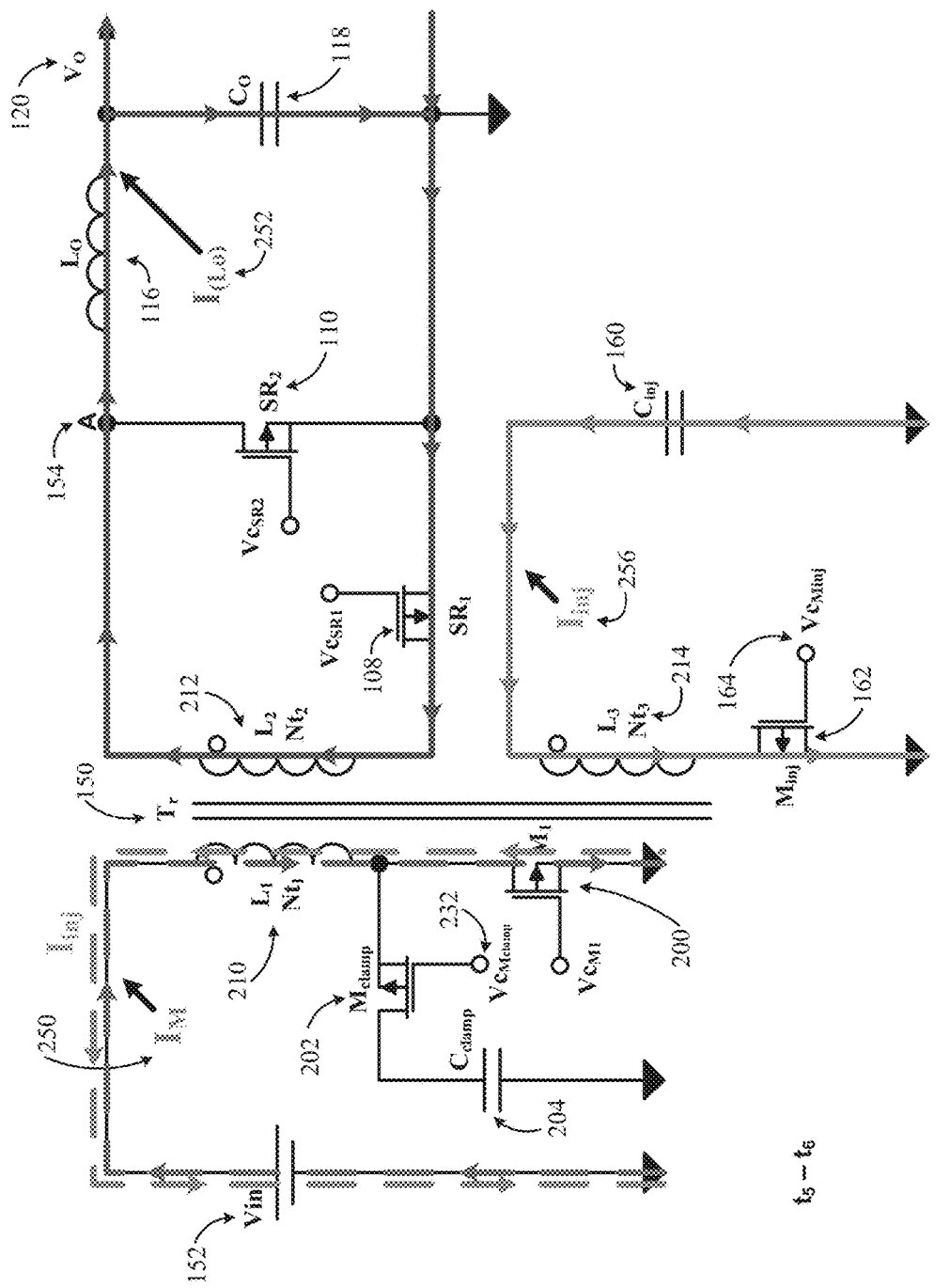
FIG. 15A shows the topology of FIG. 9A with the current flow during the time interval between t5 and t6.
Figure 15B:
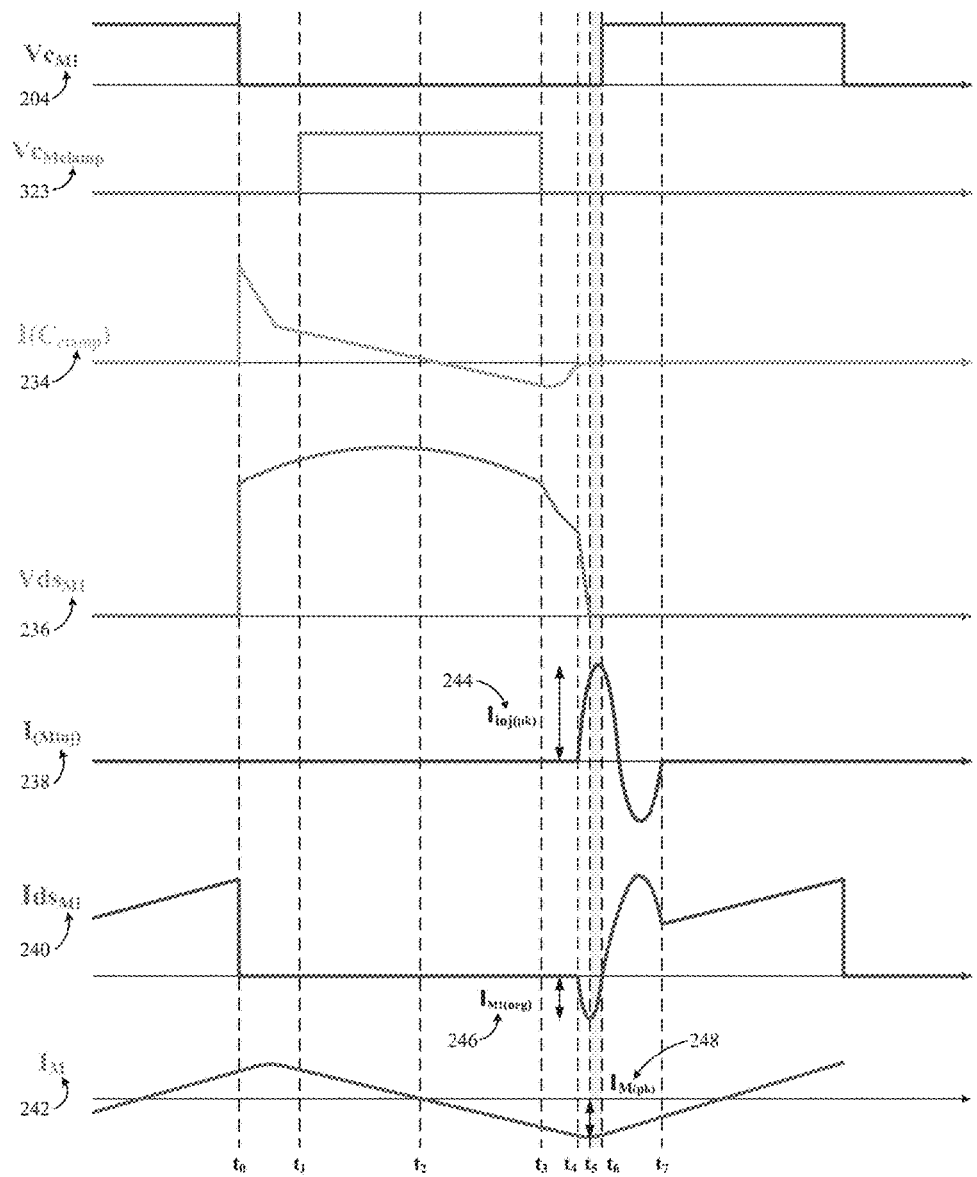
FIG. 15B shows the key waveforms for the topology of FIG. 9A, underlining the t5-t6 time interval.

During the interval t5-t6 (see FIGS. 15A, 15B: At t5, the voltage across M1 will reach zero level. The injection current reaches its peak at t5, and after that starts to decay. The injection current continue to flow into the primary winding towards the positive polarity of the input voltage source Vin, 206 During this time the injection current energy is transferred to the Vin, 206. As a design guidance, it may be preferred to reduce the duration of the time interval (t5-t6) as much as possible in order to minimize the energy circulation in the converter.

Figure 16A:
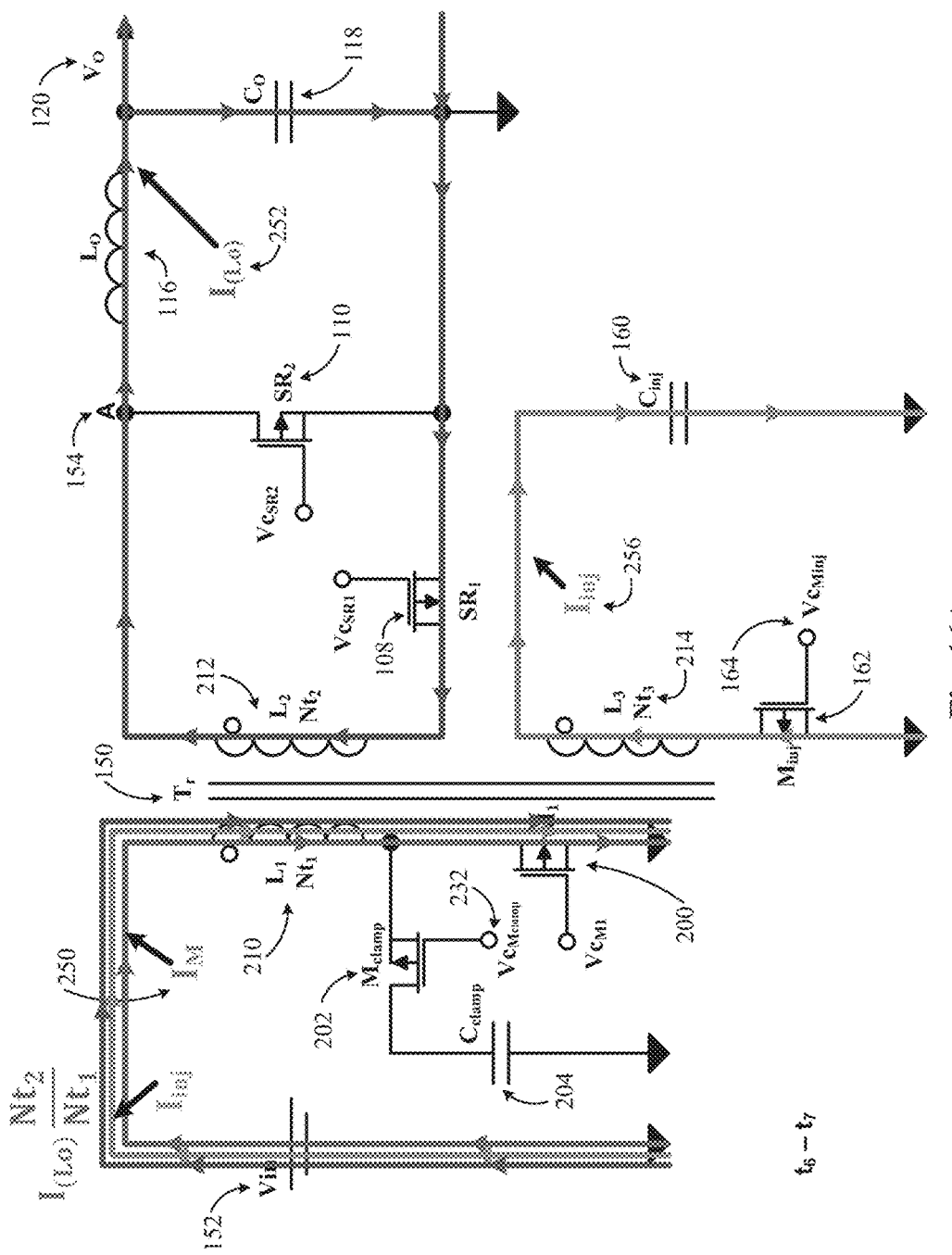
FIG. 16A shows the topology of FIG. 9A with the current flow during the time-interval t6-t7.
Figure 16B:
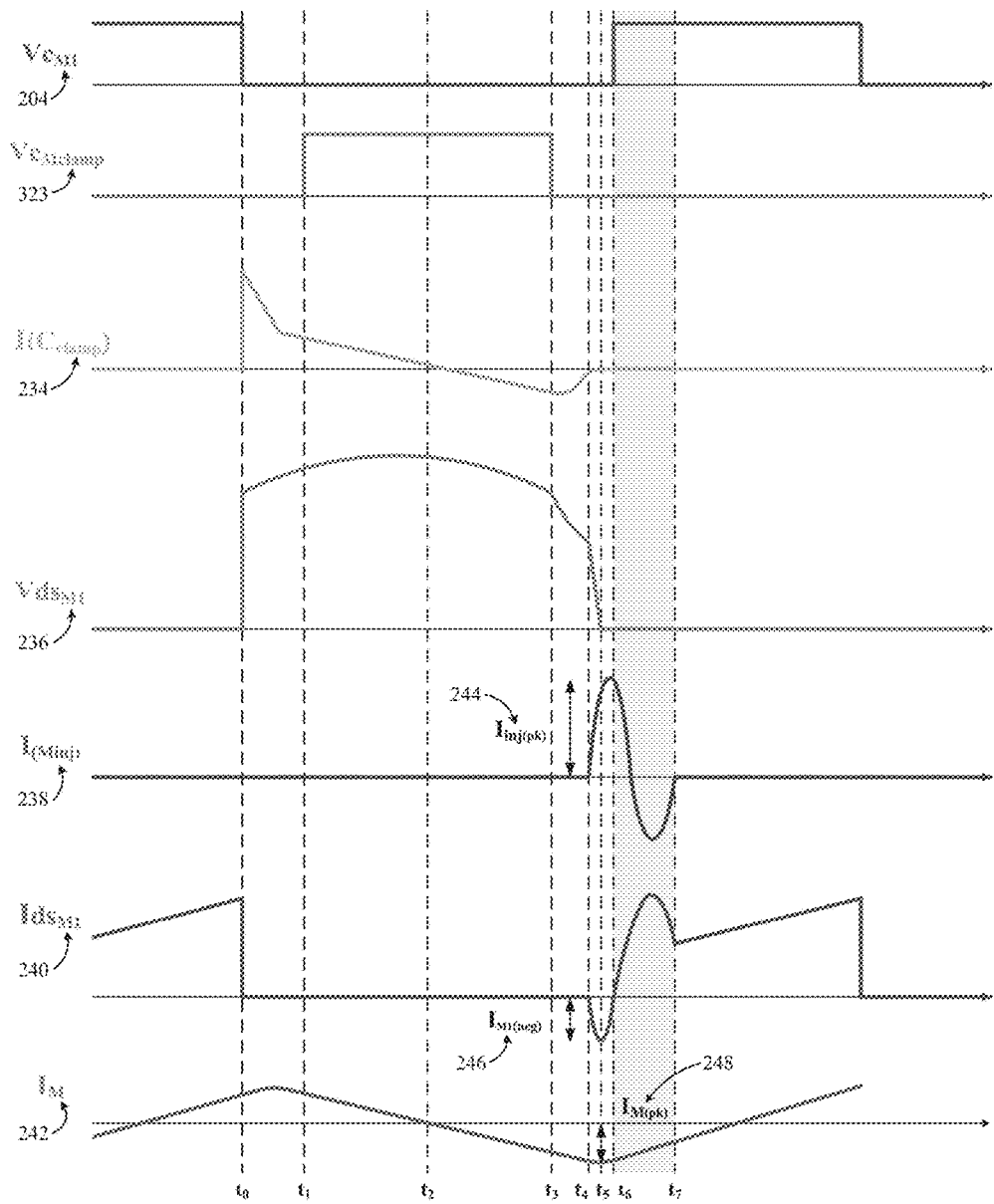
FIG. 16B shows the key waveforms for the topology of FIG. 9A, underlining the t6-t7 time interval.

During the time interval t6-t7 (and in reference to FIGS. 16A, 16B): At t6, the main switch (M1, 200) is turned on. After t6, the injection current continues to flow through the injection winding 214 and into the primary winding 210, flowing towards the positive polarity of the input voltage Vin, 206. The injection current will decay to zero and after that will change the polarity and charge the Cinj capacitor back to the level at which the Cinj was prior to t4. The Cinj capacitor, 224 is charged with the energy coming from Vin, 206. In the secondary, there is energy transfer in a forward mode through Lo towards the load. This forward energy transfer starts after the voltage across M1 decays below Vin level at t4.

At t7, the injection current reaches zero. For maximum efficiency, the Minj switch may be turned on between t4 and t7. However, for practical reasons it may be preferred to turn (Minj, 228) off prior to t7 in order to prevent a negative current flow (which would discharge the Cinj). The body diode of (Minj, 226) will carry the current after (Minj, 226) is turned off and ensure that the Cinj is charged completely.

As follows from the above description, the disclosed methodology of operating the single-ended forward power converter provide true soft switching in such forward converter. There are many ways to implement a single ended forward converter based on the way the reset of the transformer is done. In industry, it is well known the "third wire reset" type of single-ended forward topology, two transistor single-ended forward topology, active clamp single-ended forward topology, resonant reset single-ended forward topology, to name just a few. There are other single ended forward topologies which are specific versions such as the "constant voltage reset" forward topology described in U.S. Pat. No. 7,012,820 B2, for example, which is incorporated by reference herein.

It is appreciated that the described methodology applies regardless of the way the reset of the transformers is done.

Overall:

An isolated single ended forward topology contains, on the secondary side, at least a secondary winding, two elements configured to rectify current (which can be diodes, synchronized rectifiers, or any other devices that allow a unidirectional conduction). The first of these rectifier elements is referred to as a forward rectifier, which is conducting during the time period when the main primary switch is on and the energy is transferred from the input voltage source through the transformer, the forward rectifier to the output inductor and the load. (This time period is called a forward energy transfer period. During this time period, the energy from the primary input voltage source is transferred to the output inductor and some of it is transferred to the load.) The second rectifier element is referred to as a freewheeling rectifier.

The secondary side of the single-ended forward topology additionally includes an output inductor; and an output capacitor, the terminals of the output capacitor being further connected to a load.

In the primary side there exists at least one main switch, and optionally additional switchers that will perform other function (such as reset of the transformer).

The main primary switch is defined as a switch or switch(es) which is/are in conducting mode of operation during the forward energy transfer period.

When the main primary switch(es) are off, some of the energy stored in the output inductor during the forward energy transfer period is delivered to the load via the freewheeling rectifier.

In the methodologies practices by the prior art, during the freewheeling period before the primary main switch(es) turn on, the magnetizing current was arranged to flow through the freewheeling rectifier means as long as the magnitude of the magnetizing current was smaller than the magnitude of the current through the output inductor at its lowest level. In the event the magnetizing current reflected in the secondary winding is larger than the current through the output inductor, the current through the freewheeling rectifier means reaches a zero level and the freewheeling rectifier means should turn off at that time, at zero current conditions. This way one could obtain soft switching across the secondary rectifier means. This method would work theoretically, but is not being used in single-ended power converters because a very large magnetizing current would increase significantly the power dissipation in conduction and, as a result, would decrease the efficiency of operation of the overall circuitry—which the industry does not desire.

The solution presented and discussed in this application is to inject an additional pulse of current for a short period of time to add to the magnetizing current, in a such way that the aggregate amount (sum) of the magnetizing current and the additional injected pulse of current exceeds the level of the current through the output inductor before the main primary switch turns on. The injection current shall have a short duration, just during the transition time. The transition time is the time wherein the voltage across the main switch will decay from the existing level at the end of freewheeling period, to zero level. In most of the application, therefore this additional pulse of injection current may be between about 50 nS and 150 nS.

The additional pulse of current (which is injected in the injection winding), is referred to as injection current, and will reflect in the rest of the winding by the turn ratio between the injection winding and the windings where the current does reflect. In operation, the injected current will flow towards the lowest impedance. For example, during the conduction of the freewheeling rectifier, there is practically an electrical "short" across the secondary winding, and most of the injected current will go into the secondary. Once the freewheeling rectifier turns off, the impedance across the secondary winding increases and the injected current will flow into the primary winding to discharge the parasitic capacitance reflected across the main primary switch. The same applies to the magnetizing current. Once the impedance across the secondary winding increases when the freewheeling rectifier turns off, the magnetizing current will flow into the primary winding and, together with the injected current, will discharge the parasitic capacitance reflected across the main primary switch.

The shorter time duration of the injected current, the lower the RMS of the injected current and the lower the power dissipation associated with the injected current.

Before the end of the freewheeling period and just before the main primary switch(es) turn on, the current injection circuit is activated. The delay between the moment of activation of the injection current and the moment of a turn on of the main primary switch is judiciously controlled to obtain "true soft switching" in any operating conditions and to maximize the power conversion efficiency. The aggregate of the injected current and the magnetizing current shall be higher in amplitude than the lowest amplitude of the current through the output inductor. If this condition is met, the current through the freewheeling rectifier means will decay to zero, and at that time the freewheeling rectifier means turns off at zero current conditions. The magnetizing current and the injected current will further provide the current required by the output inductor and the extra current—which exceeds the level of current through the output inductor— will reflect into the primary winding and discharge the parasitic capacitance across the primary switchers towards zero.

The methodology of operating a power converter with the use of the above-described current injection approach achieves several important goals and results:

First, in the converter so-operated zero current switching conditions are created through the freewheeling rectifier means when the freewheeling rectifier turns off. Second, the parasitic capacitance across the freewheeling rectifier shall be charged, at a turn off, by a current source in order to eliminate any spikes and ringing across freewheeling rectifier and create the conditions for "true soft switching".

Finally, as a result of using the disclosed methodology, zero voltage switching conditions are created for the primary switchers. Traditionally in some of the soft switching technologies discussed in related art, the leakage inductance in the transformer is purposefully increased in order to delay the magnetizing current flow through the freewheeling rectifier means, and to allow time for the magnetizing current in the primary to discharge the parasitic capacitance across the primary switchers to zero. This prior art technique does not and, in fact, cannot create soft switching for the secondary rectifier means and, as a result, "true soft switching" is not achieved. A larger leakage inductance present in implementations practiced by the related art also causes several negative undesirable effects (such a reduction in the effective duty cycle, and an increase in the circulating current which leads to lower efficiency, to name just a few).

Notably—and as an additional practical advantage over the related art, the proposed technology works quite well even with zero leakage inductance. In particular, a lower leakage inductance decreases the circulating current and increases the effective duty cycle and efficiency.

As a result of sing the proposed methodology of operating the power converter, the efficiency of the converter is increased in several ways: a) as a result of eliminating switching losses in the primary switchers; b) as a result of eliminating the need for snubber across the secondary switching elements, as there is no ringing or spikes across the secondary switching elements during the operation as discussed; and c) as a result of allowing for a lower leakage inductance transformer, which inherently is more efficient due to the decrease of the circulating current.

For the purposes of this disclosure and the appended claims, the use of the terms "substantially", "approximately", "about" and similar terms in reference to a descriptor of a value, element, property or characteristic at hand is intended to emphasize that the value, element, property, or characteristic referred to, while not necessarily being exactly as stated, would nevertheless be considered, for practical purposes, as stated by a person of skill in the art. These terms, as applied to a specified characteristic or quality descriptor means "mostly", "mainly", "considerably", "by and large", "essentially", "to great or significant extent", "largely but not necessarily wholly the same" such as to reasonably denote language of approximation and describe the specified characteristic or descriptor so that its scope would be understood by a person of ordinary skill in the art. In one specific case, the terms "approximately", "substantially", and "about", when used in reference to a numerical value, represent a range of plus or minus 20% with respect to the specified value, more preferably plus or minus 10%, even more preferably plus or minus 5%, most preferably plus or minus 2% with respect to the specified value.

The use of these terms in describing a chosen characteristic or concept neither implies nor provides any basis for indefiniteness and for adding a numerical limitation to the specified characteristic or descriptor. As understood by a skilled artisan, the practical deviation of the exact value or characteristic of such value, element, or property from that stated falls and may vary within a numerical range defined by an experimental measurement error that is typical when using a measurement method accepted in the art for such purposes. Other specific examples of the meaning of the terms "substantially", "about", and/or "approximately" as applied to different practical situations may have been provided elsewhere in this disclosure.

References throughout this specification to "one embodiment," "an embodiment," "a related embodiment," or similar language mean that a particular feature, structure, or characteristic described in connection with the referred to "embodiment" is included in at least one embodiment of the present invention. Thus, appearances of the phrases "in one embodiment," "in an embodiment," and similar language throughout this specification may, but do not necessarily, all refer to the same embodiment. It is to be understood that no portion of disclosure, taken on its own and in possible connection with a figure, is intended to provide a complete description of all features of the invention.

In addition, it is to be understood that no single drawing is intended to support a complete description of all features of the invention. In other words, a given drawing is generally descriptive of only some, and generally not all, features of the invention. A given drawing and an associated portion of the disclosure containing a description referencing such drawing do not, generally, contain all elements of a particular view or all features that can be presented is this view, for purposes of simplifying the given drawing and discussion, and to direct the discussion to particular elements that are featured in this drawing. A skilled artisan will recognize that the invention may possibly be practiced without one or more of the specific features, elements, components, structures, details, or characteristics, or with the use of other methods, components, materials, and so forth. Therefore, although a particular detail of an embodiment of the invention may not be necessarily shown in each and every drawing describing such embodiment, the presence of this detail in the drawing may be implied unless the context of the description requires otherwise. In other instances, well known structures, details, materials, or operations may be not shown in a given drawing or described in detail to avoid obscuring aspects of an embodiment of the invention that are being discussed. Furthermore, the described single features, structures, or characteristics of the invention may be combined in any suitable manner in one or more further embodiments.

The implementation of embodiments of the invention, while not necessarily so described explicitly, may require a specifically-programmed computer-readable processor/controller the operation of which is governed by instructions stored in a tangible, non-transitory storage memory. The presence and use of such processor is within the scope of the invention. The memory may be random access memory (RAM), read-only memory (ROM), flash memory or any other memory, or combination thereof, suitable for storing control software or other instructions and data. Instruction information may be conveyed to a processor through communication media, including wired or wireless computer networks. In addition, while the invention may be embodied in software, the functions necessary to implement the invention may optionally or alternatively be embodied in part or in whole using firmware and/or hardware components, such as combinatorial logic, Application Specific Integrated Circuits (ASICs), Field-Programmable Gate Arrays (FPGAs) or other hardware or some combination of hardware, software and/or firmware components.

Disclosed aspects, or portions of these aspects, may be combined in ways not listed above. Accordingly, the invention should not be viewed as being limited to the disclosed embodiment(s).

The invention claimed is:

1. A method for operating a single-ended circuitry of a DC-to-DC converter,
the single-ended circuitry containing:
a primary side and a secondary side;
a transformer having a primary side winding on the primary side and a first secondary side winding and an auxiliary winding on the secondary side;
first and second switching elements at the primary side;
first and second reset rectifiers at the primary side;
first and second synchronous rectifiers at the secondary side;
an output inductor on the secondary side;
wherein the auxiliary winding is a part of a current injection circuitry containing a source of current,
wherein said current injection circuitry configured to transmit injection current, produced by the source of current, into the auxiliary winding,
the method comprising:

a) transferring energy from the primary side to the secondary side in a forward mode;
b) resetting the transformer with a current flowing through the first and second reset rectifiers, to cause a first current to flow at the secondary side through the at least one of the first and second synchronous rectifiers and the output inductor towards an output of the circuitry;
c) reducing an amplitude of overall current flowing through the least one of the first and second synchronous rectifiers by transmitting a first magnetizing current through said at least one of the first and second synchronous rectifiers,
wherein the first magnetizing current is generated from energy stored in parasitic capacitances of the first and second switching elements;

and
d) at the moment when voltage across the at least one of the first and second synchronous rectifiers is substantially zero, activating the source of current to deliver the injection current into the auxiliary winding and to turn the at least one of the first and second synchronous rectifiers off.

2. The method according to claim 1, wherein said reducing includes
transmitting the first magnetizing current through the at least one of the first and second synchronous rectifiers in a first direction, the first direction being opposite to a second direction, the second direction being a direction in which the first current at the secondary side flows through the at least one of the first and second synchronous rectifiers.

3. The method according to claim 1, wherein said reducing includes
switching off the at least one of the first and second synchronous rectifiers at zero current condition when said an amplitude of the first magnetizing current is higher than an amplitude of the first current.

4. The method according to claim 1, wherein a polarity of the injection current is the same as a polarity of the first magnetizing current.

5. The method according to claim 1, wherein said activating the source of current causes turning on the first and second switching elements on the primary side at a zero voltage condition and turning off the first and second synchronous rectifiers at the secondary size at a zero current condition while preventing ringing at said turning off.

6. The method according to claim 1, wherein the single-ended circuitry is configured according to any of a two transistor single-ended forward topology, an active claims single-ended forward topology, a resonant resent single-ended forward topology, and a constant voltage reset forward topology.

7. The method according to claim 1, wherein said transferring, resetting, reducing, and activating causes the converter to operate in a true soft switching mode.

* * * * *